(12) United States Patent
Kish et al.

(10) Patent No.: US 10,803,571 B2
(45) Date of Patent: Oct. 13, 2020

(54) DATA-ANALYSIS PIPELINE WITH VISUAL PERFORMANCE FEEDBACK

(71) Applicant: Cogniac, Corp., San Jose, CA (US)

(72) Inventors: William S Kish, Saratoga, CA (US); Huayan Wang, Milpitas, CA (US)

(73) Assignee: Cogniac, Corp., San Jose, CA (US)

( * ) Notice: Subject to any disclaimer, the term of this patent is extended or adjusted under 35 U.S.C. 154(b) by 178 days.

(21) Appl. No.: 16/024,735

(22) Filed: Jun. 30, 2018

(65) Prior Publication Data

US 2018/0308231 A1 Oct. 25, 2018

Related U.S. Application Data

(63) Continuation-in-part of application No. 15/990,809, filed on May 28, 2018, which is a continuation of application No. 15/432,834, filed on Feb. 14, 2017, now Pat. No. 10,019,788.

(51) Int. Cl.
| | |
|---|---|
| *G06K 9/00* | (2006.01) |
| *G06T 7/00* | (2017.01) |
| *G06K 9/66* | (2006.01) |
| *G06K 9/46* | (2006.01) |
| *G06K 9/62* | (2006.01) |

(52) U.S. Cl.
CPC .......... *G06T 7/0002* (2013.01); *G06K 9/4604* (2013.01); *G06K 9/6253* (2013.01); *G06K 9/6256* (2013.01); *G06K 9/6273* (2013.01); *G06K 9/66* (2013.01); *G06K 2209/19* (2013.01)

(58) Field of Classification Search
CPC .................. G06K 9/66; G06K 9/6253; G06T 2207/20084; G06T 2200/24
See application file for complete search history.

(56) References Cited

U.S. PATENT DOCUMENTS

| | | | |
|---|---|---|---|
| 2005/0028133 A1* | 2/2005 | Ananth | ............ G06F 8/20 717/105 |
| 2007/0214017 A1* | 9/2007 | Profio | ............ A61B 6/465 705/3 |
| 2008/0080778 A1* | 4/2008 | Cheng | ............ H04N 19/176 382/232 |

(Continued)

*Primary Examiner* — Li Liu
(74) *Attorney, Agent, or Firm* — Steven Stupp

(57) ABSTRACT

After analyzing images or videos, a computer system may display or present visual performance feedback with an interactive visual representation of a data-analysis pipeline, where the visual representation includes separate and coupled data-analysis operations in a set of data-analysis operations that includes the one or more machine-learning models. Moreover, in response to a user-interface command the specifies a given data-analysis operation, the computer system may display or present a group of images or videos and associated performance information for the given data-analysis operation, where a given image or video corresponds to an instance of the given data-analysis operation. Furthermore, when the computer system receives user feedback about one at least one of the images or videos in the group of images or videos, the computer system performs a remedial action based at least in part on the user feedback. For example, the computer system may dynamically modify the data-analysis pipeline.

20 Claims, 19 Drawing Sheets

(56) References Cited

U.S. PATENT DOCUMENTS

| | | | |
|---|---|---|---|
| 2009/0161938 A1* | 6/2009 | Shekhar | A61B 8/0883 |
| | | | 382/131 |
| 2012/0081376 A1* | 4/2012 | Sowerby | G06F 11/3612 |
| | | | 345/522 |
| 2013/0054299 A1* | 2/2013 | Deshpande | G06Q 10/06 |
| | | | 705/7.26 |
| 2015/0201895 A1* | 7/2015 | Suzuki | A61B 6/488 |
| | | | 382/131 |
| 2015/0242761 A1* | 8/2015 | Amershi | G06K 9/00536 |
| | | | 706/11 |
| 2016/0012613 A1* | 1/2016 | Okerlund | A61B 6/5211 |
| | | | 382/131 |
| 2018/0033190 A1* | 2/2018 | Ma | G06T 15/503 |
| 2019/0043161 A1* | 2/2019 | Brooks | G06F 16/9024 |

\* cited by examiner

DATA-ANALYSIS PIPELINE WITH VISUAL PERFORMANCE FEEDBACK

CROSS REFERENCE TO RELATED APPLICATIONS

This application claims priority under 35 U.S.C. 120 as a Continuation-in-Part of U.S. patent application Ser. No. 15/990,809, "Machine-Learning Measurements of Quantitative Feature Attributes," filed on May 28, 2018, which is a Continuation of U.S. patent application Ser. No. 15/432,834, "Machine-Learning Measurements of Quantitative Feature Attributes," filed on Feb. 14, 2017, the contents of both of which are herein incorporated by reference.

BACKGROUND

Field

The described embodiments relate to a technique for dynamically modifying a data-analysis pipeline using visual performance feedback.

Related Art

Ongoing advances in the capabilities of electronic devices are making them increasingly popular. In addition, the widespread availability of electronic devices and their increasing functionality has resulted in a large number of applications.

For example, many electronic devices include imaging sensors, such as CMOS image sensors, that users and applications use to acquire images and videos. The content in these images and videos often includes useful information for the users. In principle, if the associated subset of the content that includes the information (which are sometimes referred to as 'features') can be accurately identified, additional value-added services can be provided to the users.

One approach for identifying features in images is to train a detector, such as a machine-learning model, that attempts to identify features on an electronic device (such as a computer system) using images in a training dataset. Then, the detector may be used on the electronic device or another electronic device to processes images.

However, in practice, it is often difficult to build or train an appropriate machine-learning model for a particular application. For example, many machine-learning models are complicated. Given this complexity, it can be difficult to determine how to modify a machine-learning model to address errors or outliers. Often, such modifications involve a time-consuming and expensive trial-and-error process, which can constrain the performance of the machine-learning model, and which can be frustrating for users and can adversely impact the user experience.

SUMMARY

The described embodiments relate to a computer system that dynamically modifies a data-analysis pipeline, such as a data-analysis pipeline for images or videos. This computer system may include: an analysis module that performs a set of data-analysis operations in a data-analysis pipeline, wherein the data-analysis operations include one or more machine-learning models; and a display module that presents visual performance feedback with an interactive visual representation of the data-analysis pipeline, wherein the visual representation includes separate and coupled data-analysis operation in the set of data-analysis operations. When the computer system receives a user-interface command that specifies a given data-analysis operation, the display module presents a group of images or videos and associated performance information for the given data-analysis operation, wherein a given image or video corresponds to an instance of the given data-analysis operation. Moreover, when the computer system receives user feedback about one at least one of the images or videos in the group of images or videos, the computer system performs a remedial action based at least in part on the user feedback.

Note that the remedial action may include the analysis module modifying the data-analysis pipeline based at least in part on the user feedback. For example, the modification may include one of: changing the given data-analysis operation, or adding another data-analysis operation to the data-analysis pipeline. Moreover, the changing of the given data-analysis operation may involve specifying a target signature or a search-area signature. Furthermore, the adding of the other data-analysis operation may involve at least bifurcating the given data-analysis operation.

In some embodiments, when the computer system receives a second user-interface command that specifies the given image or video, the display module presents the given image or video and associated performance information for the given data-analysis operation.

Moreover, the group of images or videos may include outliers having different performance information than a majority of instances of the given data-analysis operation.

Furthermore, the data-analysis operations in the set of data-analysis operations may be coupled in series, in parallel or both in the visual representation. Note that the visual representation may correspond to a workflow in the data-analysis pipeline.

Additionally, the user feedback may include one of: a target signature, a search-area signature, or a classification or label.

In some embodiments, the one or more machine-learning models includes a neural network.

Another embodiment provides an electronic device that includes an imaging sensor that captures the group of images or videos and that executes program instructions to perform at least some of the aforementioned operations.

Another embodiment provides a method for dynamically modifies a data-analysis pipeline, which may be performed by the computer system or the electronic device.

The preceding summary is provided as an overview of some embodiments and to provide a basic understanding of aspects of the subject matter described herein. Accordingly, the above-described features are merely examples and should not be construed as narrowing the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
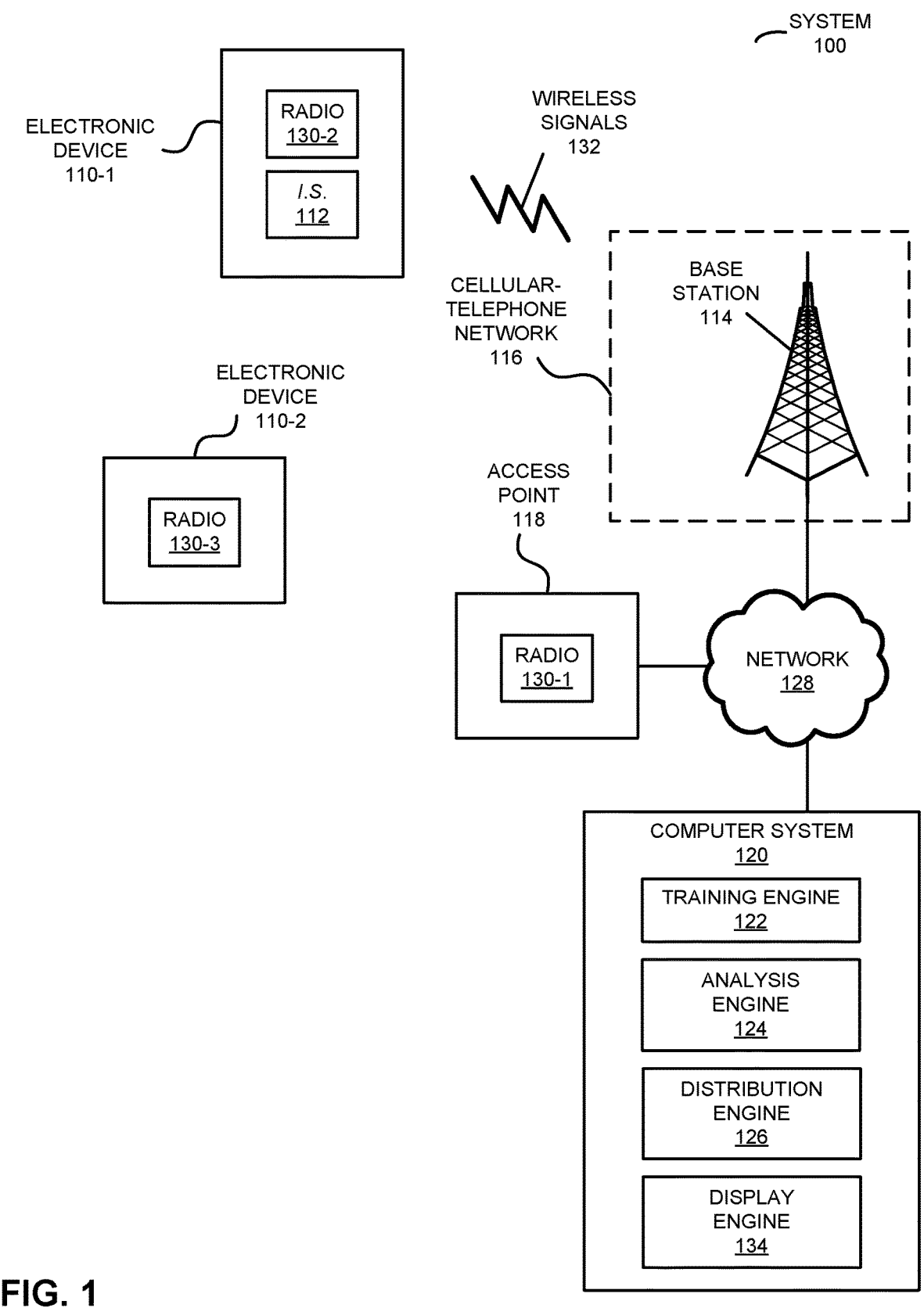
FIG. 1 is a block diagram illustrating an example of a system that trains one or more machine-learning models, analyzes images or videos, provides visual performance feedback, and dynamically modifies a data-analysis pipeline in accordance with an embodiment of the present disclosure.

A computer system may train and use a data-analysis pipeline with one or more machine-learning models (such as a neural network) to analyze images or videos. After performing the analysis, the computer system may display or present visual performance feedback with an interactive visual representation of the data-analysis pipeline, where the visual representation includes separate and coupled data-analysis operations in a set of data-analysis operations that includes the one or more machine-learning models. Moreover, in response to a user-interface command the specifies a given data-analysis operation, the computer system may display or present a group of images or videos and associated performance information for the given data-analysis operation, where a given image or video corresponds to an instance of the given data-analysis operation. Furthermore, when the computer system receives user feedback about one at least one of the images or videos in the group of images or videos, the computer system performs a remedial action based at least in part on the user feedback. For example, the computer system may dynamically modify the data-analysis pipeline.

By presenting the visual performance feedback and dynamically modifying the data-analysis pipeline based at least in part on the subsequent user feedback, this analysis technique may allow a user to visually monitor the performance of the data-analysis pipeline and to selectively and interactively update the data-analysis pipeline. For example, the user feedback may specify a change to given data-analysis operation or may add another data-analysis operation to the data-analysis pipeline. Consequently, the analysis technique may allow the user to intuitively and simply adapt the data-analysis pipeline in order to, e.g., correct for outliers, etc. Therefore, the analysis technique may be easy to use and may allow the user to flexibly and efficiently improve the performance (such as the accuracy) of the data-analysis pipeline in less time and with reduced expense relative to existing analysis techniques. These capabilities may improve the user experience when using the computer system and when using the data-analysis pipeline to analyze images or videos.

In the discussion that follows, an individual or a user may be a person. Also, or instead, the analysis technique may be used by any type of organization, such as a business (which should be understood to include for-profit corporations), non-profit corporations, groups (or cohorts) of individuals, sole proprietorships, government agencies, partnerships, etc.

Moreover, in the discussion that follows, electronic devices and/or components in a system (such as the computer system) may communicate using a wide variety of communication protocols. For example, the communication may involve wired or wireless communication. Consequently, the communication protocols may include: an Institute of Electrical and Electronics Engineers (IEEE) 802.11 standard (which is sometimes referred to as 'Wi-Fi®,' from the Wi-Fi Alliance of Austin, Tex.), Bluetooth® (from the Bluetooth Special Interest Group of Kirkland, Wash.), another type of wireless interface (such as another wireless-local-area-network interface), a cellular-telephone communication protocol (e.g., a 3G/4G/5G communication protocol, such as UMTS, LTE), an IEEE 802.3 standard (which is sometimes referred to as 'Ethernet'), etc. In the discussion that follows, Ethernet and Wi-Fi are used as illustrative examples.

Communication among electronic devices is shown in FIG. 1, which presents a block diagram illustrating a system 100 that trains one or more machine-learning models and analyzes images or videos using a data-analysis pipeline that includes the one or more machine-learning models. Notably, system 100 includes one or more electronic devices 110 (such as portable electronic devices, e.g., cellular telephones, cameras, etc.) at least some of which may include an optional imaging sensor (I.S.) 112 (such as a CMOS image sensor, a CCD, a camera, etc.), optional base station 114 in cellular-telephone network 116, optional access point 118 and/or a computer system 120 (such as a server), which are sometimes collectively referred to as 'components' in system 100. Moreover, computer system 120 may include: a training engine (or module) 122, an analysis engine (or module) 124, a distribution engine (or module) 126 and/or display engine (or module) 134.

Note that components in system 100 may communicate with each other via cellular-telephone network 116 and/or a network 128 (such as the Internet and/or a wireless local area network or WLAN). For example, distribution engine 126 in computer system 120 may provide one or more machine-learning models to one of electronic devices 110 (such as electronic device 110-1) via cellular-telephone network 116 and/or network 128. Alternatively or additionally, computer system 120 may receive images and/or videos from electronic devices 110, and may analyze the images and/or videos using the one or more machine-learning models, which may be arranged or configured in a data-analysis pipeline. In general, at least portions of the one or more machine-learning models may be executed by one or more of electronic devices 110, computer system 120 or both.

In addition, electronic device 110-1 may provide, via cellular-telephone network 116 and/or network 128, a notification (such as feedback about the operation of at least one of the one or more machine-learning models) to distribution engine 126. Thus, the communication in system 100 may be wired and/or wireless.

In embodiments where the communication involves wireless communication via a WLAN, the wireless communication includes: transmitting advertising frames on wireless channels, detecting another component in system 100 by scanning wireless channels, establishing connections (for example, by transmitting association requests, data/management frames, etc.), optionally configuring security options (e.g., Internet Protocol Security), and/or transmitting and receiving packets or frames via the connection (which may include information that specifies the one or more machine-learning models, the measurement results, etc.). Moreover, in embodiments where the communication involves wireless communication via cellular-telephone network 116, the wireless communication includes: establishing connections, and/or transmitting and receiving packets (which may include information that specifies the one or more machine-learning models, the measurement results, etc.).

Figure 18:
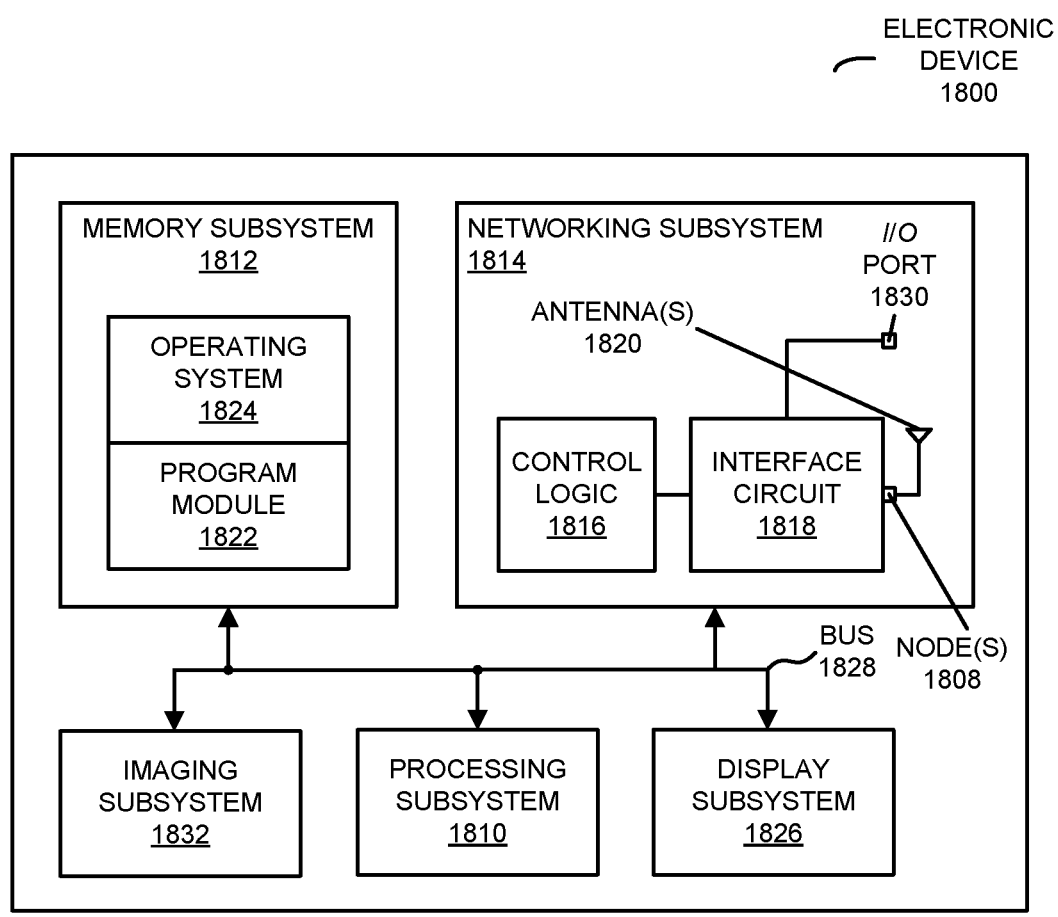
FIG. 18 is a block diagram illustrating an example of an electronic device in the system of FIG. 1 in accordance with an embodiment of the present disclosure.

As described further below with reference to FIG. 18, electronic devices 110, optional base station 114, optional access point 118 and/or computer system 120 may include subsystems, such as a networking subsystem, a memory subsystem and a processor subsystem. In addition, electronic devices 110, optional base station 114, optional access point 118 and/or computer system 120 may include radios 130 in the networking subsystems. More generally, the components can include (or can be included within) any electronic devices with the networking subsystems that enable these components to communicate with each other.

Moreover, as can be seen in FIG. 1, wireless signals 132 (represented by jagged lines) are transmitted by radios 130 in the components. For example, radio 130-1 in optional access point 118 may transmit information (such as frames or packets) using wireless signals 132. These wireless signals may be received by radios 130 in one or more of the other components, such as by electronic device 110-1. This may allow computer system 120 to communicate information to electronic device 110-1.

In the described embodiments, processing a packet or frame in a component may include: receiving the wireless signals with the packet or frame; decoding/extracting the packet or frame from the received wireless signals to acquire the packet or frame; and processing the packet or frame to determine information contained in the packet or frame (such as the one or more machine-learning models, measurement results, etc.).

Note that the communication between at least any two of the components in system 100 may be characterized by one or more of a variety of performance metrics, such as: a received signal strength indication (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

As discussed previously, it can be difficult to accurately identify certain types of features in the images using existing machine-learning models. Notably, while existing machine-learning models are routinely used to perform classification of features or content in images, it can be difficult to quantitatively analyze the features or content in the images.

As described further below with reference to FIGS. 2-5, in order to address this problem, training engine 122 may train or generate one or more machine-learning models based at least in part on a set of reference images that include content with instances of a quantitative feature attribute and one or more feedback metrics associated with the instances of the quantitative feature attribute, which may be stored and, thus, accessed in local or remotely located memory. For a given reference image in the set of reference images, the one or more feedback metrics may specify at least a location of at least an instance of the quantitative feature attribute in the given reference image and a numerical value associated with at least the instance of the quantitative feature attribute. For example, there be one or more instances of the quantitative feature attribute in the set of reference images and the numerical values may include counts of the one or more instances of the quantitative feature attribute in the set of reference images. Alternatively or additionally, the numerical values may correspond to geometric lengths association with the instances of the quantitative feature attribute in the set of reference images. Moreover, the numerical value may include cardinalities of the instances of the quantitative feature attribute in the set of reference images. Furthermore, the one or more feedback metrics may include reference information that specifies the locations of the instances of the quantitative feature attribute in the set of reference images.

Therefore, after the training, the one or more machine-learning model may be used to perform quantitative analysis on one or more images. For example, computer system 120 may receive, via network 128, one or more images with additional content from at least one of electronic devices 110, such as electronic device 110-1. The additional content may be different from the content in the set of reference images, but may include additional instances of the quantitative feature.

Then, analysis engine 124 may use at least one of the one or more machine-learning model to analyze the one or more images to perform measurements of one or more additional instances of the quantitative feature attribute in the one or more images. For example, as described further below with reference to FIGS. 4 and 5, the measurement results for one of the one or more images may include one or more second numerical values, such as a geometric length of an additional instance of the quantitative feature attribute or a count of a number of occurrences of the additional instances of the quantitative feature attribute in an image.

Note that the one or more second numerical values in the measurement results may fall within a parameter space defined by the range of numerical values of the instances of the quantitative feature attribute in set of reference images. Alternatively, the one or more second numerical values in the measurement results may be outside of the parameter space. Notably, once a given machine-learning model is trained to perform quantitative measurements of the geometric lengths or to count the number of instances of the quantitative feature attribute in the set of reference images, the machine-learning model may not be constrained to only analyze images with instances of the quantitative feature attribute that have numerical values of the geometric lengths or the count that are within the range of numerical values in the set of reference images.

This capability of the one or more machine-learning models may be different than existing machine-learning models. For example, the machine-learning model may be a neural network. Typical existing neural networks are generalized function approximators. Stated differently, typical existing neural networks are lossy compute compression engines. While these existing neural networks are capable of processing or analyzing large amounts of information to identify or classify (and thus to extract) desired information or features, they are usually constrained by the training dataset, so that the can only reliably identify or classify features that are similar to those on which the existing neural networks were trained.

In contrast, the one or more machine-learning models in the measurement technique may be trained to perform at least a mathematical operation on the additional instances of the quantitative feature attribute, such as counting a number of occurrences (i.e., addition), measurement of a geometric length or an angle (e.g., subtraction or comparison), determining a cardinality (such as identifying or classifying a number of different numerical values, and then counting the total number), etc. As such, this general mathematical capability of the one or more machine-learning models may accurately perform the measurements for second numerical values that are very different from the numerical values in the set of reference images. In order to facilitate the general mathematical capability, the one or more images may include information or metadata that directly or indirectly specifies a size of at least a portion of the image. For example, the information about the portion of the image may include a magnification of the image if the image was acquired using a different imaging sensor or a different magnification than the set of reference images.

After performing the measurements, computer system 120 may provide to one or more of electronic devices 110 at least a measurement results for one of the one or more images. The measurement result may include a second numerical value associated with the one or more additional instances of the quantitative feature attribute in the image. For example, computer system 120 may transmit a frame with the measurement result to electronic device 110-1. Note that the measurement result may include information specifying one or more locations of the one or more additional instances of the quantitative feature attribute in the image.

While the preceding discussion had computer system 120 performing the quantitative analysis using the one or more machine-learning models, in other embodiments one or more of electronic devices 110 (such as electronic device 110-1) performs the quantitative analysis. For example, distribution engine 126 may provide instructions for the one or more machine-learning models. Note that the instructions may include an architecture of the machine-learning model, weights associated with the machine-learning model, one or more libraries and/or a set of pre-processing transformations for use when executing the machine-learning model on the one or more images. In response, electronic device 110-1 may configure the machine-learning model based at least in part on the instructions. Then, electronic device 110-1 may analyze the one or more images using at least one of the machine-learning model.

Note that computer system 120 and/or electronic device 110-1 may select the machine-learning model based at least in part on metadata associated with the one or more images (such as an image context associated with the one or more images, e.g., one or more formats and/or one or more image characteristics of the one or more images, etc.). (Alternatively, the machine-learning model may have been pre-selected or pre-specified before the one or more images were received from or acquired by electronic device 110-1.)

Notably, the image context of the one or more images may be associated with or may include: a format (such as an aspect ratio, a resolution, a color space, etc.); a particular location (such as a fixed location or a variable location) of the source of the one or more images (i.e., a location of electronic device 110-1 when the one or more images were acquired); a type of the source (such as a type of imaging sensor 112); an identifier of the source; other features in the one or more images than the features (such as an object in the one or more images); an attribute of the one or more images (such as a location of a light source, a signal-to-noise ratio, a histogram of the light intensity in the one or more images, an f-number or a magnification, another metric of the light intensity, an image-quality metric, etc.); and/or a time of day the one or more mages were acquired. Then, if the metadata specifies one or more of these items, computer system 120 or electronic device 110-1 can select the machine-learning model out of the one or more available machine-learning models based at least in part on the metadata. In embodiments where distribution engine 126 provides the instructions for the one or more machine-learning models to electronic device 110-1, the instructions may specify the image context (and, thus, the machine-learning model). Alternatively or additionally, electronic device 110-1 may determine the image context. For example, the determination of the image context may be performed dynamically to improve a performance metric of the machine-learning model (such as accuracy of quantitative analysis).

Note that the machine-learning model may be implemented and executed on computer system 120 and/or electronic device 110-1 using or in conjunction with hardware (such as a processor, a graphical processing unit or GPU, etc.) and/or a software application, such as image-acquisition software and/or image-analysis software. This software application may be a standalone application or a portion of another application that is resident on and that executes on computer system 120 and/or electronic device 110-1 (such as a software application that is provided by computer system 120 and/or electronic device 110-1, or that is installed on and that executes on computer system 120 and/or electronic device 110-1). Alternatively or additionally, at least a portion of the software application executing on computer system 120 and/or electronic device 110-1 may be an application tool that is embedded in the web page, and that executes in a virtual environment of a web browser. Thus, the application tool may be provided to a user of computer system 120 and/or electronic device 110-1 via a client-server architecture. In some embodiments, the software application includes Caffe (from the Berkley Vision and Learning Center at the University of California, Berkley, Calif.) and, more generally, a deep-learning framework.

Moreover, as described further below with reference to FIGS. 7-17, in some embodiments computer system 120 may perform an analysis technique that provides visual performance feedback about a data-analysis pipeline that includes the one or more machine-learning models. For example, display engine 134 may present or display (on a display) an interactive visual representation of the data-analysis pipeline. This visual representation may include separate and coupled data-analysis operations in a set of data-analysis operations that includes the one or more machine-learning models. Moreover, in response to computer system 120 receiving (e.g., from a user of computer system 120) a user-interface command the specifies a given data-analysis operation, display engine 134 may display or present a group of images or videos and associated performance information for the given data-analysis operation, where a given image or video corresponds to an instance of the given data-analysis operation. Furthermore, when the computer system receives user feedback about one at least one of the images or videos in the group of images or videos, computer system 120 may perform a remedial action based at least in part on the user feedback. For example, analysis engine 124 may automatically and dynamically modify the data-analysis pipeline.

Although we describe the network environment shown in FIG. 1 as an example, in alternative embodiments, different numbers or types of electronic devices may be present. For example, some embodiments comprise more or fewer components. As another example, in another embodiment, different components are transmitting and/or receiving packets or frames.

Figure 2:
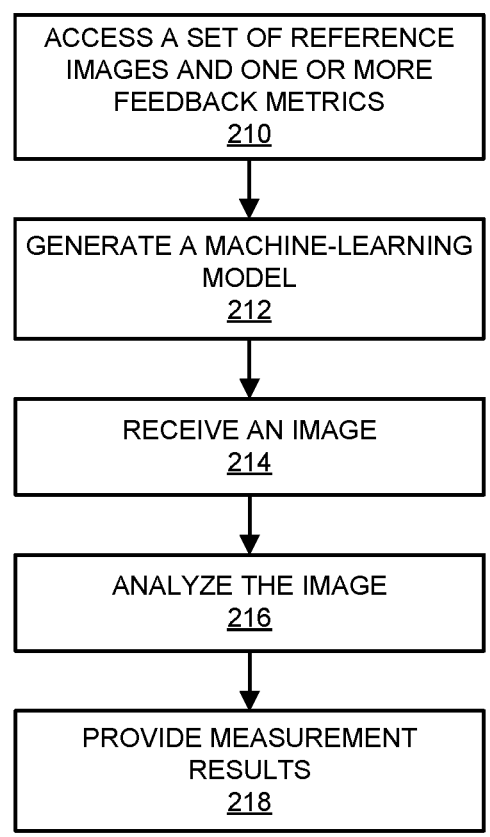
FIG. 2 is a flow diagram illustrating an example of a method for quantitatively analyzing an image in the system in FIG. 1 in accordance with an embodiment of the present disclosure.

We now describe embodiments of a measurement technique. FIG. 2 presents a flow diagram illustrating an example of a method 200 for quantitatively analyzing an image, which may be performed by a computer system (such as computer system 120 in FIG. 1). During operation, the computer system may access (operation 210), in memory, a set of reference images that include content with instances of a quantitative feature attribute (such as a few hundred instances) and one or more feedback metrics associated with the instances of the quantitative feature attribute, where, for a given reference image in the set of reference images, the one or more feedback metrics specify at least a location of at least an instance of the quantitative feature attribute in the given reference image and a numerical value associated with at least the instance of the quantitative feature attribute.

Note that at least the instance of the quantitative feature attribute may include multiple instances and the numerical value may include a count of the multiple instances of the quantitative feature attribute in the given reference image. Alternatively or additionally, the numerical value may correspond to a geometric length association with at least the instance of the quantitative feature attribute in the given reference image. Moreover, the numerical value may include a cardinality and/or a range of at least the instance of the quantitative feature attribute.

Furthermore, the one or more feedback metrics may include one or more of: an offset of at least the instance of the quantitative feature attribute from an edge of the given reference image (such as a distance from an edge pixel); an offset of at least the instance of the quantitative feature attribute from a location in the given reference image (such as a center of the given reference image); a line or distance in the given reference image that corresponds to at least the instance of the quantitative feature attribute; and an area in the given reference image that includes at least the instance of the quantitative feature attribute (such as a region that include or surrounds the instance of the quantitative feature attribute). Thus, the one or more feedback metrics may include reference information that specifies at least the location of at least the instance of the quantitative feature attribute.

Then, the computer system may generate a machine-learning model (operation 212) based at least in part on the set of reference images and the one or more feedback metrics. Notably, the computer system may train the machine-learning model using the set of reference images and the one or more feedback metrics. This training may iterate until a desired or target accuracy is achieved, such as 70, 80, 90 or 95%. For example, the machine-learning model may perform quantitative measurements on the instances of the quantitative feature attributes in the set of reference images (i.e., a training dataset) based at least in part on the one or more feedback metrics analyze one or more images to determine measurement results, and the computer system may compare the measurement results with the one or more feedback metrics to determine the accuracy during an iteration of the training. Note that the machine-learning model may include a neural network.

Moreover, the computer system may receive, from an electronic device, an image (operation 214) having additional content.

Next, the computer system may analyze the image (operation 216) using the machine-learning model to perform measurements of one or more additional instances of the quantitative feature attribute in the image. For example, the second numerical value may specify: a count of the one or more additional instances of the quantitative feature attribute in the image; and/or a geometric length association with the one or more additional instances of the quantitative feature attribute in the image. In these embodiments, the image may include information that, directly or indirectly (such as a magnification), specifies a size of at least a portion of the image. Moreover, the measurement result may include information specifying one or more locations of the one or more additional instances of the quantitative feature attribute in the image.

Furthermore, the computer system may provide a measurement result (operation 218) for the image, the measurement result including a second numerical value associated with the one or more additional instances of the quantitative feature attribute in the image. For example, the measurement result may be provided to the electronic device and/or another electronic device, such as by transmitting the second numerical value.

In this way, the computer system (for example, software executed in an environment, such as an operating system, of the computer system) may ensure that the machine-learning model can quantitatively analyze the image to determine the measurement results. This capability may facilitate automation and other value-added services, and thus enhance the user experience when using the electronic device and/or the computer system.

In some embodiments of method 200, there may be additional or fewer operations. Moreover, the order of the operations may be changed, and/or two or more operations may be combined into a single operation.

Figure 3:
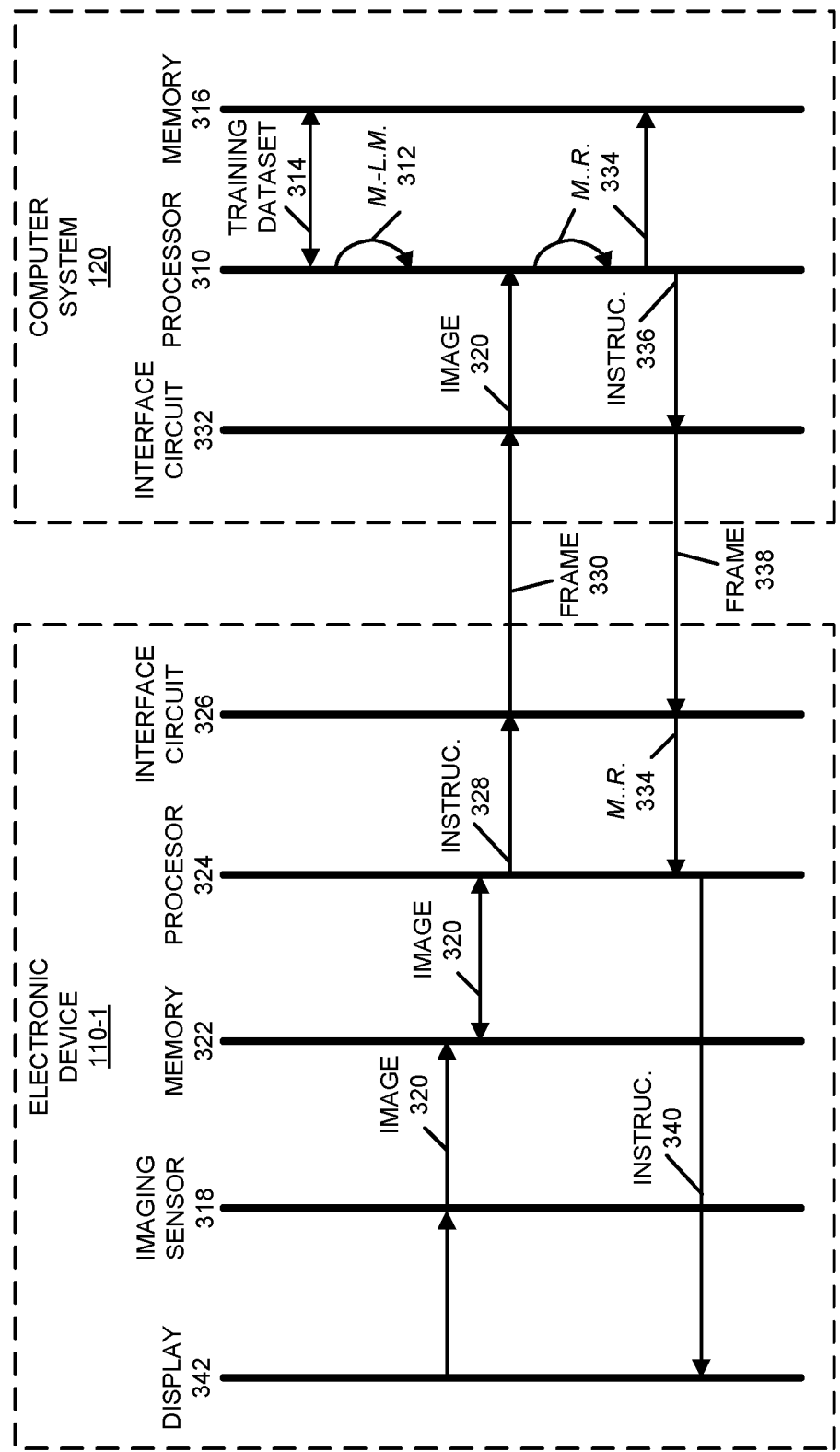
FIG. 3 is a drawing illustrating an example of communication among components in the system in FIG. 1 in accordance with an embodiment of the present disclosure.

Embodiments of the measurement technique are further illustrated in FIG. 3, which presents a drawing illustrating an example of communication among components in system 100 (FIG. 1). Notably, during the measurement technique, processor 310 in computer system 120 (which may include or may be executing training engine 122 in FIG. 1) may train a machine-learning model (M.-L. M.) 312 using a training dataset 314 that includes the set of reference images and the one or more feedback metrics, which may be accessed in memory 316.

Subsequently, imaging sensor 318 in electronic device 110-1 may acquire an image 320, which is stored in memory 322. Moreover, processor 324 may access image 320 and may instruct 328 interface circuit 326 to provide image 320 to computer system 120.

In response, interface circuit 326 may transmit a frame 330 with image 320 to computer system 120. After receiving frame 330, interface circuit 332 in computer system 120 may provide image 320 to processor 310. Processor 310 may execute machine-learning model 312 to determine measurement results 334 by quantitatively analyzing image 320, and may store measurement results 334 in memory 316.

Then, processor 310 may instruct 336 interface circuit 332 to provide measurement results 334 to electronic device 110-1. In response, interface circuit 332 may transmit frame 338 to electronic device 110-1. After receiving frame 338, interface circuit 326 may provide measurement results 334 to processor 324, which may instruct 340 a display 342 to present or display measurement results 334 to a user of electronic device 110-1.

Figure 4:
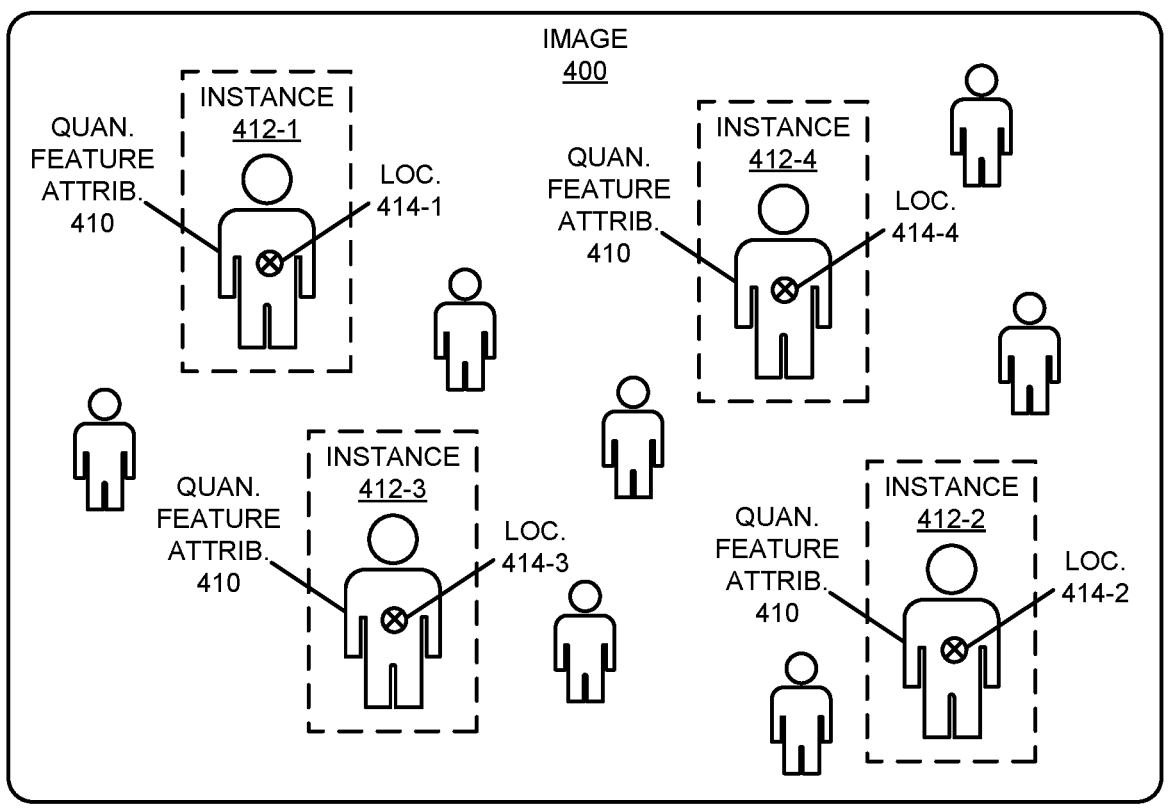
FIG. 4 is a drawing illustrating an example of quantitative analysis of an image using the system in FIG. 1 in accordance with an embodiment of the present disclosure.

We now describe examples of quantitative feature attributes in an image. FIG. 4 presents a drawing illustrating an example of quantitative analysis of an image 400 using system 100 in FIG. 1. Notably, image 400 includes multiple instances 412 of a quantitative feature attribute 410, such as people in a crowd having particular attributes. For example, quantitative feature attribute 410 may include individuals taller than a particular minimum height (such as 5'4").

Thus, the measurement results output or provided by the machine-learning model may include a count of the number of instances 412 (such as four). This may involve a combination of identification or classification (i.e., determining those individuals that are taller than a minimum height) and addition or summation to determine the count. Note that identification may involve the machine-learning model making an association with an attribute or subject tag associated with quantitative feature attribute 410, such as 'person' or 'human.' In some embodiments, the measurement results may include information specifying locations 414 of instances 412 of quantitative feature attribute 410 in image 400.

While the preceding example illustrated the use of the measurement technique to count the number of people taller than a minimum height, in other embodiments the one or more feedback metrics associated with the set of reference images may include a cardinality of the instances of the quantitative feature attribute, such as people at specified locations in the reference images who have heights in predefined ranges (such as between 5' and 5'6", between 5'6" and 6', etc.). In these embodiments, the measurement results may include counts of the number of people in image 400 that have heights in the predefined ranges (i.e., a set of numerical values instead of a single numerical value).

Figure 5:
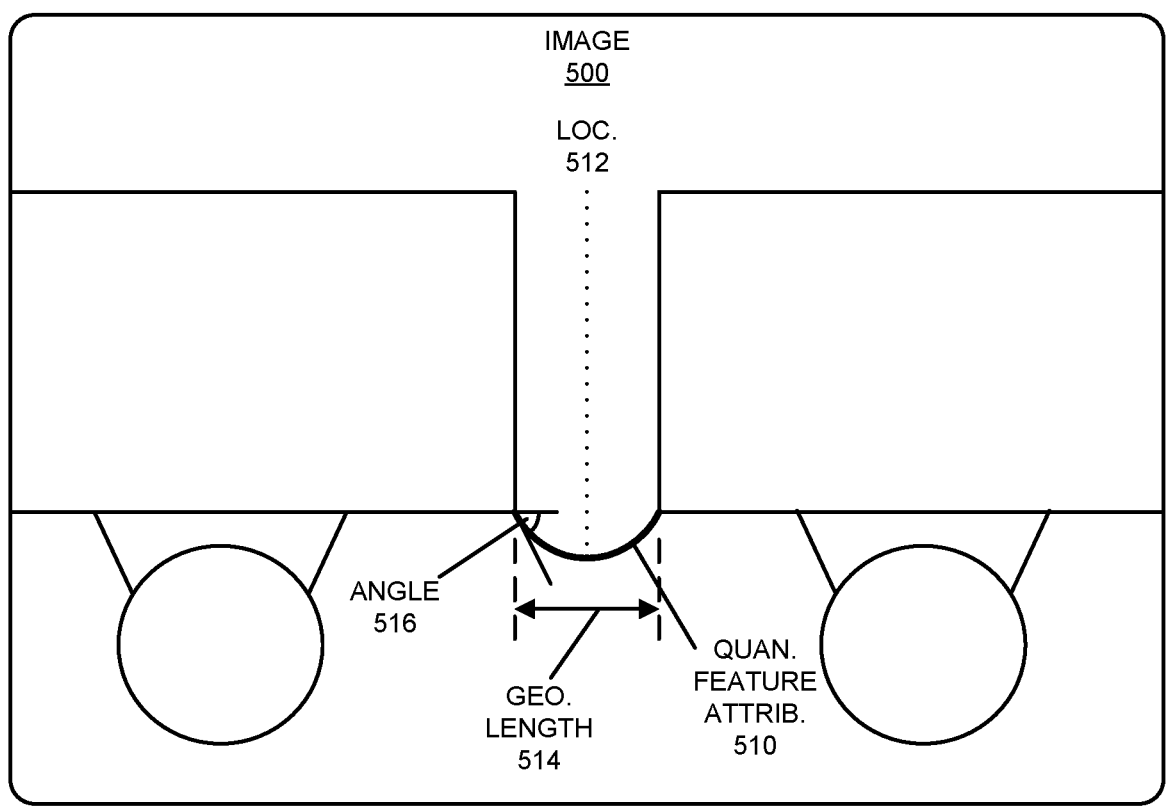
FIG. 5 is a drawing illustrating an example of quantitative analysis of an image using the system in FIG. 1 in accordance with an embodiment of the present disclosure.

FIG. 5 presents a drawing illustrating an example of quantitative analysis of an image 500 using system 100 in FIG. 1. Notably, image 500 includes an instances of a quantitative feature attribute 510 at a location 512. Quantitative feature attribute 510 may have a geometric length 514 and/or an angle 516 associated with it. For example, quantitative feature attribute 510 may be a brake cable on a train that is susceptible to damage if geometric length 514 and/or angle 516 are incorrect or outside of a range of acceptable values. Alternatively, quantitative feature attribute 510 may be a spacing between rails that can cause a train derailment if it is larger than an acceptable upper bound. Consequently, the measurement results output or provided by the machine-learning model may include a numerical value of geometric length 514 and/or angle 516. This capability may facilitate automated visual inspection of quantitative feature attribute 510. In some embodiments, geometric length 514 and/or angle 516 may be measured based at least in part on the number of pixels in image 500.

Thus, the machine-learning model may be trained for use with a variety of applications, including classification, detection and/or quantitative measurements.

As noted previously, in order to facilitate the quantitative analysis using the machine-learning model, image 500 may include information that, directly (such as a reference scale or length) or indirectly (such as a magnification), specifies a size of at least a portion of image 500. This additional information or metadata may allow the machine-learning model to quantitatively analyze images that may have different formats and/or magnifications than those in the set of reference images.

In some embodiments, the machine-learning model in the measurement technique includes a supervised-learning model or an unsupervised-learning model. Moreover, the machine-learning model may include or may be based at least in part on supervised or machine-learning techniques, such as: a neural network (e.g., a convolutional neural network), support vector machines, classification and regression trees, logistic regression, LASSO, linear regression and/or another (linear or nonlinear) supervised-learning technique. Furthermore, the machine-learning model may have: invariance to specific transformations (e.g., similarity transformations, affine transformations, etc.); robustness to photometric distortions and noise; computational efficiency; and, depending on the particular task, the ability to generalize to feature or object categories. Furthermore, the machine-learning model may include one or more of: an edge or a line-segment detector, a texture-based feature detector, a texture-less feature detector, a scale invariant feature transform (SIFT)-like object-detector, a speed-up robust-features (SURF) detector, a binary-descriptor (such as ORB) detector, a binary robust invariant scalable keypoints (BRISK) detector, a fast retinal keypoint (FREAK) detector, a binary robust independent elementary features (BRIEF) detector, a features from accelerated segment test (FAST) detector, a motion detector (such as a Gaussian-mixture model), etc.

The machine-learning model may be trained using quantitative labeled data, such as one or more instances of the quantitative feature attribute and one or more associated feedback metrics in one or more reference images. Moreover, the machine-learning model may be trained using metadata associated with the reference images, such as: a location where an image was acquired, a type of source, an identifier of a particular source, an attribute of the reference image, image-quality metrics, a time of day, etc. For example, a training module executed by the computer system may perform hyper-parameter optimization in a multi-dimensional space of parameters to determine one or more machine-learning models (such as 1000 machine-learning models) based at least in part on quantitative labeled data and the metadata, so that the best performing machine-learning model(s) for particular quantitative feature attributes and/or images can be determined. Note that in some embodiments the machine-learning model(s) are trained using back propagation based at least in part on the quantitative labeled data.

Figure 6:
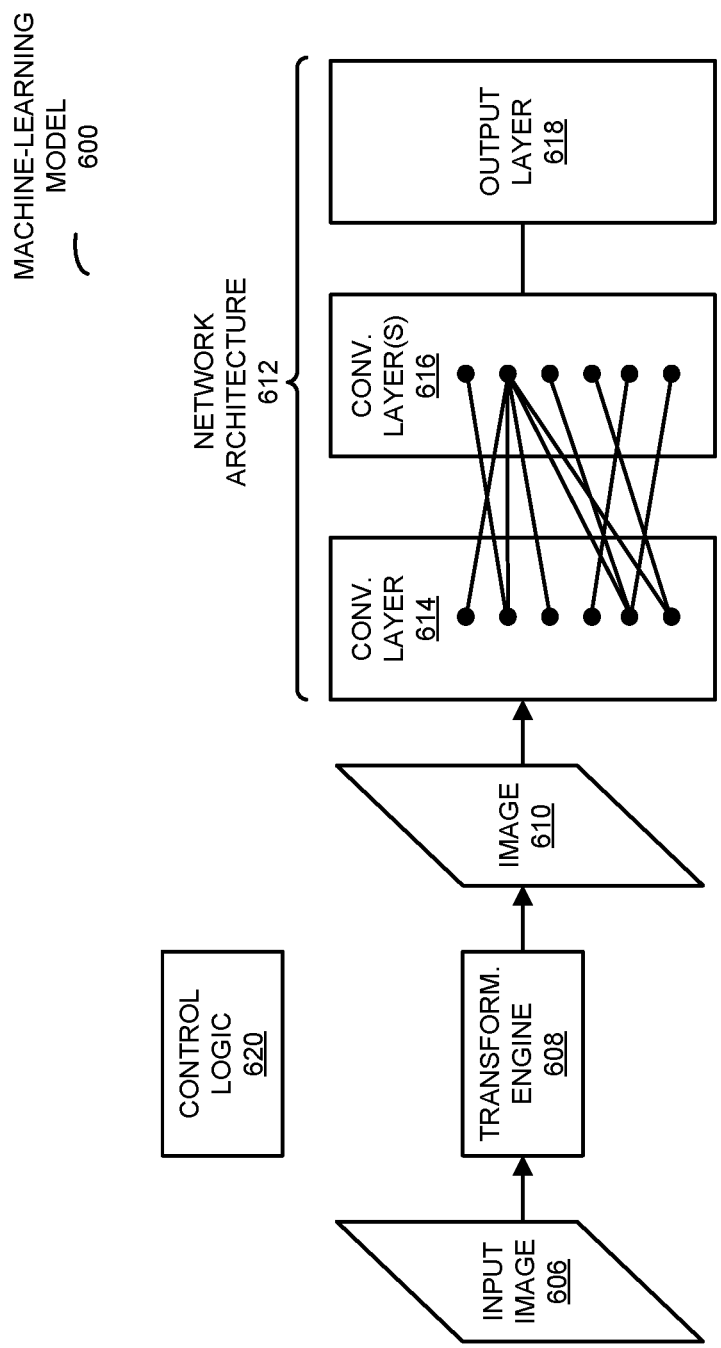
FIG. 6 is a drawing illustrating an example of a machine-learning model in accordance with an embodiment of the present disclosure.

As shown in FIG. 6, which presents a drawing illustrating an example of a machine-learning model 600. Notably, machine-learning model 600 may be implemented using a convolutional neural network. This neural network may include a network architecture 612 that includes: an initial convolutional layer 614 that provides filtering of image 610; an additional convolutional layer(s) 616 that apply weights; and an output layer 618 (such as a rectified linear layer) that performs quantitative measurements (e.g., counting a number of instances of a quantitative feature attribute or determining a geometric length of a quantitative feature attribute). Note that the details with the different layers in machine-learning model 600, as well as their interconnections, may define network architecture 612 (such as a directed acyclic graph). These details may be specified by the instructions for machine-learning model 600. In some embodiments, machine-learning model 600 is reformulated as a series of matrix multiplication operations.

Machine-learning model 600 may be able to handle the real-world variance in 1 million images or more. However, machine-learning model 600 may be trained or developed based at least in part on input image 610 having a particular format (such as 256×256 bits, i.e., a square aspect ratio). Thus, machine-learning model 600 may have an input receptive field that expects a particular type of input. Nonetheless, in general an initial input image 606 may have a different format. For example, relative to image 610, image 606 may have one of a variety of file formats (such as JPEG), a different size, a different resolution, etc. Thus, in order to analyze image 606 using machine-learning model 600, it may need to be transformed using one or more pre-processing transformations by transformation engine, module or circuit 608 into image 610. Note that the one or more pre-processing transformations may include: cropping (such as center cropping), mapping (such as rescaling), data augmentation (such as changing an aspect ratio), changing a color space (such as to RGB), changing a resolution (such as from greyscale [0, 255] to [0, 1] or [−0.5, 0.5]), etc.

The instructions for machine-learning model 600 may specify the one or more pre-processing transformations performed by transformation engine 608. Alternatively, control logic 620 may analyze image 606 to determine an image context and then, based at least in part on the image context, may select the one or more pre-processing transformations performed by transformation engine 608. Thus, in some embodiments, the one or more pre-processing transformations (and, more generally, front-end processing of image 606) may be optimized (such as by using hyper-parameter optimization).

Note that machine-learning model 600 may be used to analyze an image or a sequence of images, such as video acquired at a frame rate of, e.g., 700 frames/s.

In some embodiments, machine-learning model 600 includes layers of detectors. These model features may be reused in different machine-learning models (as opposed to randomly retraining a new machine-learning model).

We now describe embodiments of a neural network. In a typical training regime, a large convolutional network model may include 60 M parameters and 650,000 neurons. The convolutional network model may include eight learned layers with weights, including five convolutional layers and three fully connected layers with a final 1000-way softmax that produces a distribution over the 1000 class labels. Some of the convolution layers may be followed by max-pooling layers. In order to make training faster, the convolutional network model may use non-saturating neurons (such as a local response normalization) and an efficient dual parallelized GPU implementation of the convolution operation. In addition, in order to reduce overfitting in the fully-connected layers, a regularization technique (which is sometimes referred to as 'dropout') may be used. In dropout, the predictions of different models are efficiently combined to reduce test errors. Notably, the output of each hidden neuron is set to zero with a probability of 0.5. The neurons that are 'dropped out' in this way do not contribute to the forward pass and do not participate in backpropagation. Note that the convolutional network model may maximize the multinomial logistic regression objective, which may be equivalent to maximizing the average across training cases of the log-probability of the correct label under the prediction distribution.

In some embodiments, the kernels of the second, fourth, and fifth convolutional layers are coupled to those kernel maps in the previous layer that reside on the same GPU. The kernels of the third convolutional layer may be coupled to all kernel maps in the second layer. Moreover, the neurons in the fully connected layers may be coupled to all neurons in the previous layer. Furthermore, response-normalization layers may follow the first and second convolutional layers, and max-pooling layers may follow both response-normalization layers as well as the fifth convolutional layer. A nonlinear model of neurons, such as Rectified Linear Units, may be applied to the output of every convolutional and fully-connected layer.

In some embodiments, the first convolutional layer filters a 224×224×3 input image with 96 kernels of size 11×11×3 with a stride of four pixels (this is the distance between the receptive field centers of neighboring neurons in a kernel map). Note that the second convolutional layer may take as input the (response-normalized and pooled) output of the first convolutional layer and may filter it with 256 kernels of size 5×5×48. Furthermore, the third, fourth, and fifth convolutional layers may be coupled to one another without any intervening pooling or normalization layers. The third convolutional layer may have 384 kernels of size 3×3×256 coupled to the (normalized, pooled) outputs of the second convolutional layer. Additionally, the fourth convolutional layer may have 384 kernels of size 3×3×192, and the fifth convolutional layer may have 256 kernels of size 3×3×192. The fully-connected layers may have 4096 neurons each. Note that the numerical values in the preceding and the remaining discussion below are for purposes of illustration only, and different values may be used in other embodiments.

In some embodiments, the convolutional network model is implemented using at least two GPUs. One GPU may run some of the layer parts while the other runs the remaining layer parts, and the GPUs may communicate at certain layers. The input of the convolutional network model may be 150,528-dimensional, and the number of neurons in the remaining layers in the convolutional network model may be given by 253,440-186,624-64,896-64,896-43,264-4096-4096-1000.

The convolutional network model may be pre-trained on a quantitative training dataset. During the training, the convolutional network model may be repeatedly subjected to the training image set and retrained using a backpropagation technique, in which errors in the output from the convolutional network model may be used as feedback to adjust the parameters in the convolutional network model until the output error in the measurement results reaches some minimum level (such as 1, 5, 10, 20 or 30%).

Once a trained measurement model is available for a particular application, it can be deployed as part of the system or downloaded from the system for remote deployment (i.e., to one or more electronic devices, such as cellular telephones). When a model is deployed as part of the system, images input into the system may be analyzed using a particular machine-learning model based at least in part on a per-application configuration. The input images may then be processed by the previously trained per-application convolutional neural network to produce an output result unique to the application. Moreover, the output result may include measurement results for the quantitative feature attributes associated with the application. In some embodiments, output coordinates specifying the location of the quantitative feature attributes in the input image can also be produced by the convolutional neural network.

While the images that are analyzed by the machine-learning model(s) may include content in the visible spectrum, in other embodiments other types of content may be analyzed. Thus, the input data may include a variety of other types of content, including: audio, measurements of an environmental condition (such as the temperature, humidity, barometric pressure, wind direction, wind speed, reflected sunlight, etc.), images associated with different wavelengths of light (such as infrared images, ultraviolet images or x-ray images), acoustic imaging (such as ultrasound or seismic measurements), radar images, an arbitrary type of data or information, etc. In some embodiments, the images are of at least a portion of an individual (instead of an environment). Thus, the images processed by the computer system and/or the electronic device may include medical images or medical information, such as data from: computed tomography, magnetic resonance imaging, an electroencephalogram, an ultrasound, positron emission spectroscopy, an x-ray, etc.

Moreover, while the preceding discussion illustrated the use of a particular machine-learning model to analyze an image, in other embodiments a set of multiple machine-learning models are used concurrently. In this ensemble approach, over time the best performing machine-learning models for a particular image, quantitative feature attribute may be identified from the set of machine-learning models.

Furthermore, in the preceding discussion, the source of the input data included a physical camera or an imaging sensor. However, in other embodiments the source may include a 'virtual camera', such as an electronic device, computer or server that provides images to the electronic device for analysis. Thus, the measurement technique may be used to analyze images that have recently been acquired, to analyze images that are stored in the computer system or the electronic device and/or to analyze images received from other electronic devices. For example, the measurement technique may be used to analyze images associated with a social network of interacting individuals who exchange or post content, including images.

Figure 7:
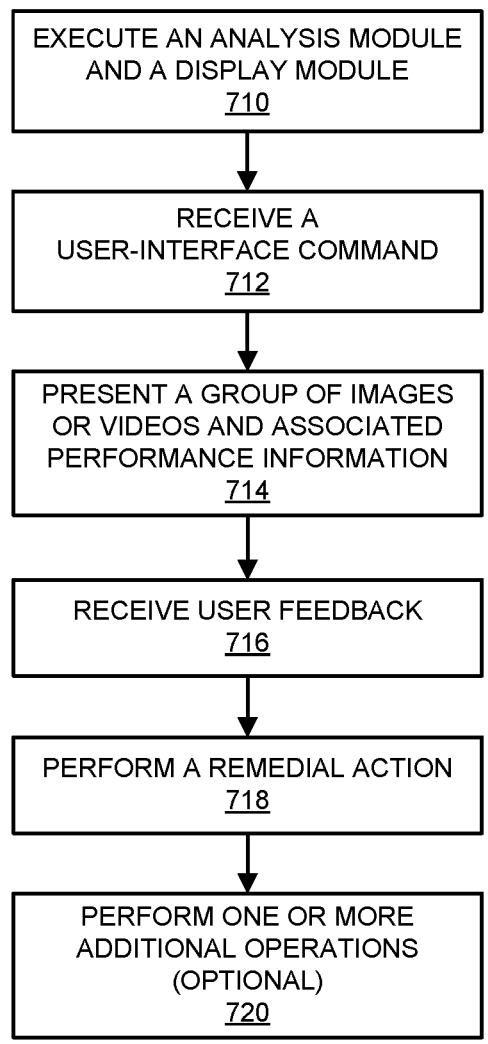
FIG. 7 is a flow diagram illustrating an example of a method for dynamically modifying a data-analysis pipeline in the system in FIG. 1 in accordance with an embodiment of the present disclosure.

We now describe embodiments of an analysis technique. FIG. 7 presents a flow diagram illustrating an example of a method 700 for dynamically modifying a data-analysis pipeline, which may be performed by a computer system (such as computer system 120 in FIG. 1). During operation, the computer system executes an analysis module (operation 710) that performs a set of data-analysis operations in a data-analysis pipeline, where the data-analysis operations comprise one or more machine-learning models (such as one or more neural networks), and a display module (operation 710) that presents visual performance feedback with an interactive visual representation of the data-analysis pipeline, where the visual representation comprises separate and coupled data-analysis operation in the set of data-analysis operations.

Note that the data-analysis pipeline may analyze images or videos (such as sets of images). Moreover, the data-analysis operations in the set of data-analysis operations may be coupled in series, in parallel or both in the visual representation. Furthermore, the visual representation may correspond to a workflow in the data-analysis pipeline.

Then, the computer system receives a user-interface command (operation 712) that specifies a given data-analysis operation. For example, a user of the computer system may: activate a virtual icon in a touch-sensitive user interface, activate a physical button or knob in a user interface, provide the user-interface command using a human-interface device (such as a mouse, a touchpad, etc.), perform a gesture, gaze at or focus on the user-interface command, and/or provide a spoken or verbal command.

Moreover, in response to the user-interface command, the computer system (such as the display module) presents a group of images or videos and associated performance information (operation 714) for the given data-analysis operation, where a given image or video corresponds to an instance of the given data-analysis operation. Note that the group of images or videos may include outliers having different performance information than a majority of instances of the given data-analysis operation.

Next, the computer system receives user feedback (operation 716) about one at least one of the images or videos in the group of images or videos. For example, the user feedback may include one of: a target signature, a search-area signature, or a classification or label.

Furthermore, the computer system (such as the analysis module) performs a remedial action (operation 718) based at least in part on the user feedback. For example, the remedial action may include the analysis module that automatically modifies the data-analysis pipeline based at least in part on the user feedback. In some embodiments, the modification include one of: changing the given data-analysis operation, or adding another data-analysis operation to the data-analysis pipeline. The changing of the given data-analysis operation may involve specifying a target signature or a search-area signature. Additionally, the adding of the other data-analysis operation may involve at least bifurcating the given data-analysis operation.

In some embodiments, the computer system optionally performs one or more additional operations (operation 720). For example, when the computer system receives a second user-interface command that specifies the given image or video, the display module may present the given image or video and associated performance information for the given data-analysis operation.

In some embodiments of method 700, there may be additional or fewer operations. Moreover, the order of the operations may be changed, and/or two or more operations may be combined into a single operation.

Figure 8:
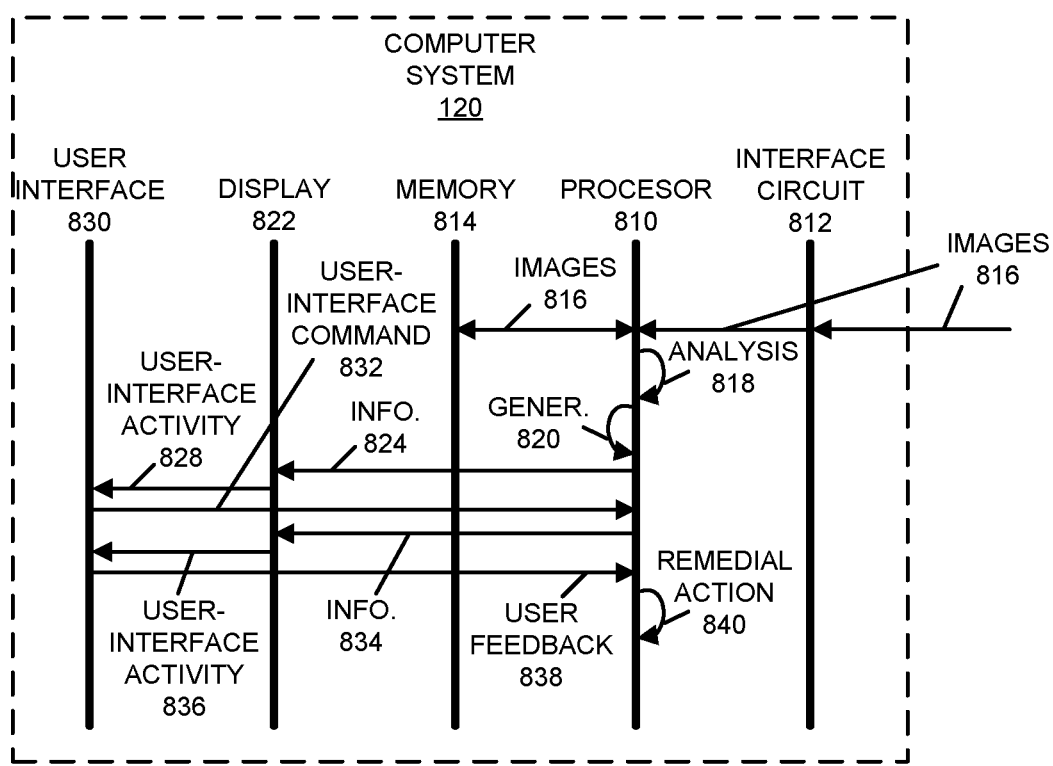
FIG. 8 is a drawing illustrating an example of communication among components in the system in FIG. 1 in accordance with an embodiment of the present disclosure.

Embodiments of the analysis technique are further illustrated in FIG. 8, which presents a drawing illustrating an example of communication among components in system 100 (FIG. 1). Notably, during the analysis technique, processor 810 in computer system 120 (which may include or may be executing analysis engine 124 in FIG. 1) may receive via interface circuit 812 or may access in memory 814 images 816 (or videos). Then, processor 810 may analyze 818 images 816 (or videos) using a data-analysis pipeline with a set of data-analysis operations including one or more machine-learning models.

Moreover, processor 810 (which may include or may be executing display module 134 in FIG. 1) may generate 820 and provide to display 822 in computer system 120 information 824 corresponding to visual performance feedback with an interactive visual representation of the data-analysis pipeline. This information may be displayed on display 822.

Next, a user may use user interface in computer system 120 to provide a user-interface command 832 that specifies a given data-analysis operation. For example, display 822 may be a touch-sensitive display, and user-interface activity 828 that specifies the user-interface command 832 may be provided from display 822 to user-interface controller 830, which determines the user-interface command 832.

In response to the user-interface command 832, processor 810 may determine provide to display 822 information 834 corresponding to a group of images or videos and associated performance information for the given data-analysis operation. This information may be displayed on display 822.

Furthermore, the user may use the user interface to provide user feedback 838 about one at least one of the images or videos in the group of images or videos. For example, display 822 may provide user-interface activity 836 that specifies user feedback 838 to user-interface controller 830, which determines user feedback 838.

Note that user feedback 838 may include one of: a target signature, a search-area signature, or a classification or label. Thus, the user may interact with the user interface to define a target signature (such as a particular pattern or shape, spectral content, etc.) or a search-area signature (such as a region having a particular shape, e.g., a rectangular or a circular shape, etc.) in at least the one of the images or videos.

Based at least in part on the user feedback 838, processor 810 may perform a remedial action 840. For example, the remedial action 840 may include modifying the data-analysis pipeline based at least in part on the user feedback 834. In some embodiments, the modification include one of: changing the given data-analysis operation (such as one or more analysis parameters associated with the given data-analysis operation), or adding another data-analysis operation to the data-analysis pipeline. The changing of the given data-analysis operation may involve specifying a target signature or a search-area signature that are used in the given data-analysis operation. Additionally, the adding of the other data-analysis operation may involve at least bifurcating the given data-analysis operation.

Figure 9:
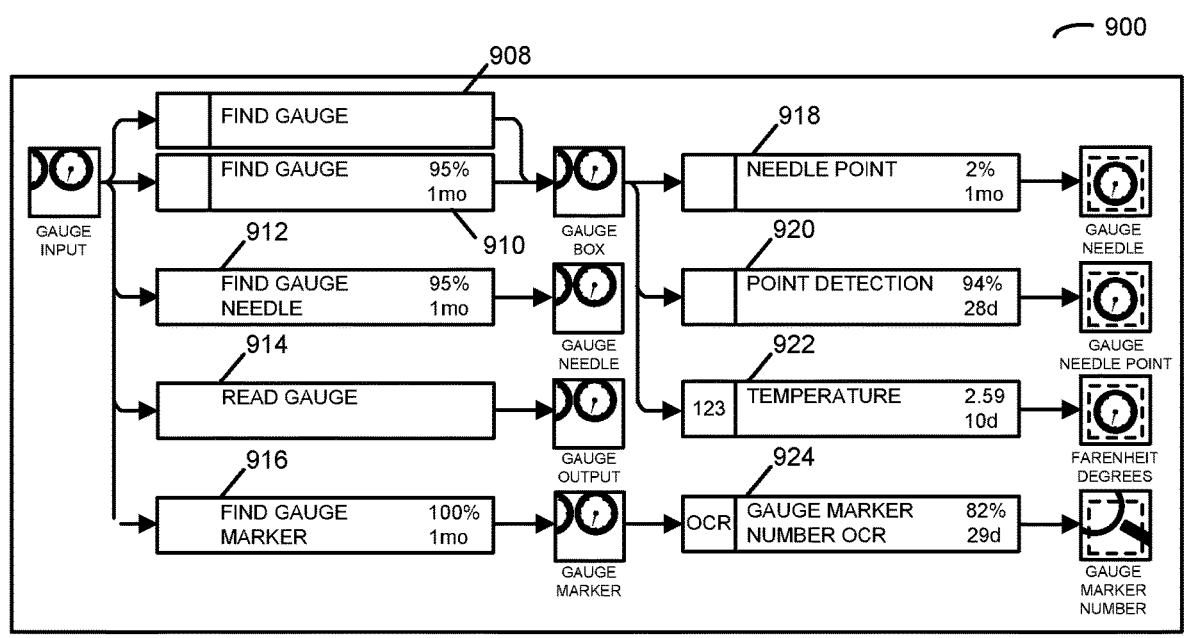
FIG. 9 is a drawing illustrating an example of a visual representation of a data-analysis pipeline using the system in FIG. 1 in accordance with an embodiment of the present disclosure.

We now describe embodiments of the visual performance feedback with an interactive visual representation of a data-analysis pipeline. FIG. 9 presents a drawing illustrating an example of a visual representation of a data-analysis pipeline 900 using system 100 in FIG. 1, such as a screenshot of information displayed on a display. Notably, data-analysis pipeline 900 may be used to read out images of analog gauges by performing a set of data-analysis operations, including: finding a gauge in operation 910 (which may involve defining or determining a box around the gauge); identifying or finding the gauge needle in operation 912; reading the gauge in operation 914; and/or finding a gauge marker in operation 916.

Moreover, the set of data-analysis operations may include one or more additional operations. For example, finding the gauge (operation 910) may provide an image of the identified gauge box to: a needle point operation 918 that provides an image of the gauge needle; a point detection operation 920 that provides an image of the point of the gauge needle; and/or a temperature operation 922 that determines a temperature corresponding to the gauge reading. Furthermore, reading the gauge (operation 914) may provide or determine a gauge output. Additionally, finding the gauge marker (operation 916) may provide an image of the gauge marker that is used in a gauge marker number operation 924 that provides an image or that determines the gauge marker number. For example, the gauge marker number (operation 924) may involve optical character recognition.

Note that the displayed visual performance feedback for the set of data-analysis operations in data-analysis pipeline 900 may include associated performance metrics (such as: an accuracy, a confidence interval, a true positive rate, a false positive rate, etc.) during a time interval (such as 1-30 days, 1-12 months, 1 or more years, etc.).

Moreover, note that some of the data-analysis operations in data-analysis pipeline 900 are coupled in series, while other data-analysis operations are coupled in parallel. Furthermore, the data-operations in data-analysis pipeline 900 are separate or decomposed, so that it is easy for a user to assess the performance of the different data-analysis operations and/or to provide user feedback and, thus, to modify data-analysis pipeline 900. Note that the data-analysis operations in data-analysis pipeline 900 correspond to a workflow when images or videos are analyzed using the one or more machine-learning models in data-analysis pipeline 900.

Figure 10:
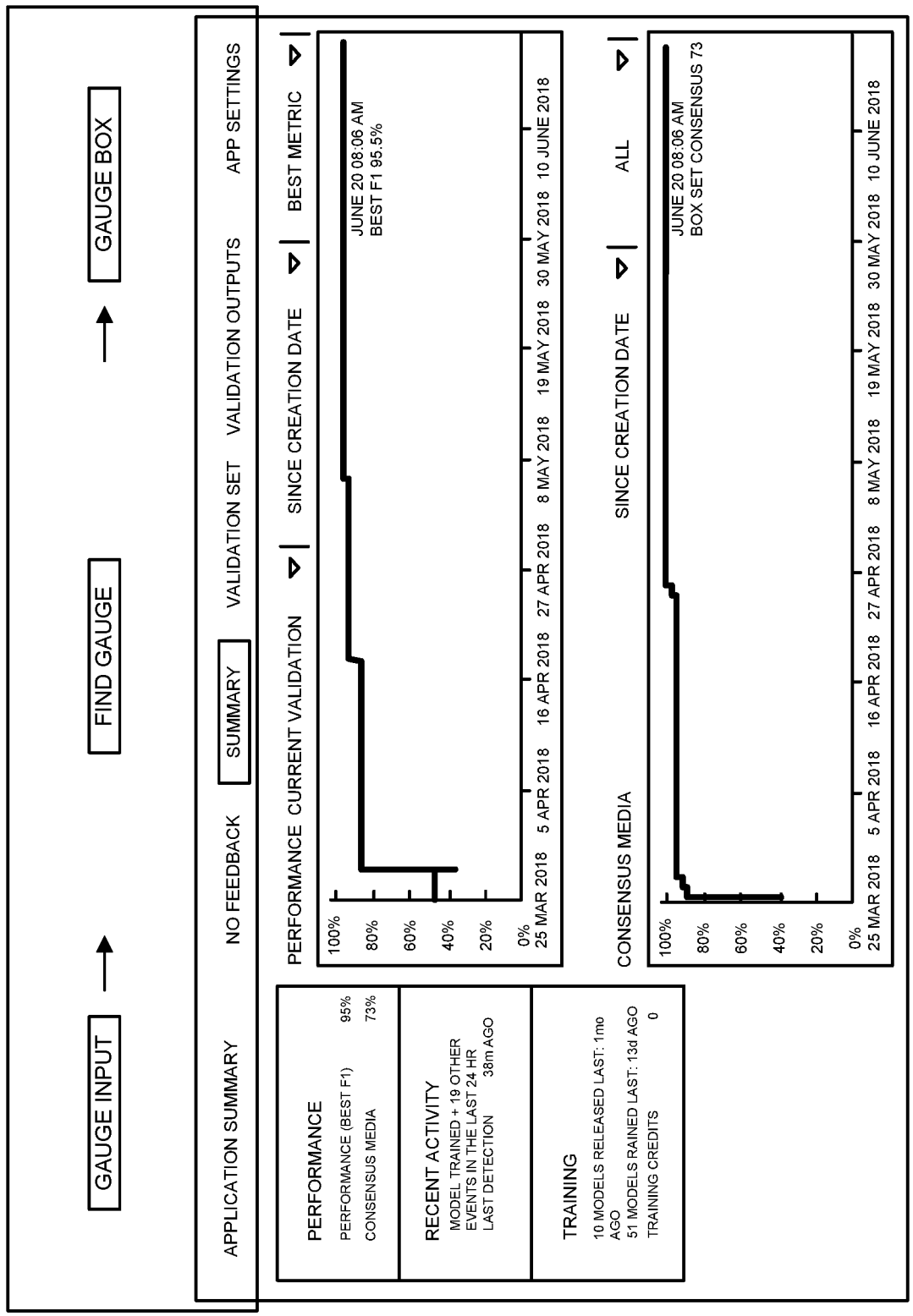
FIG. 10 is a drawing illustrating an example of performance metrics for a data-analysis operation in the data-analysis pipeline of FIG. 9 in accordance with an embodiment of the present disclosure.
Figure 11:
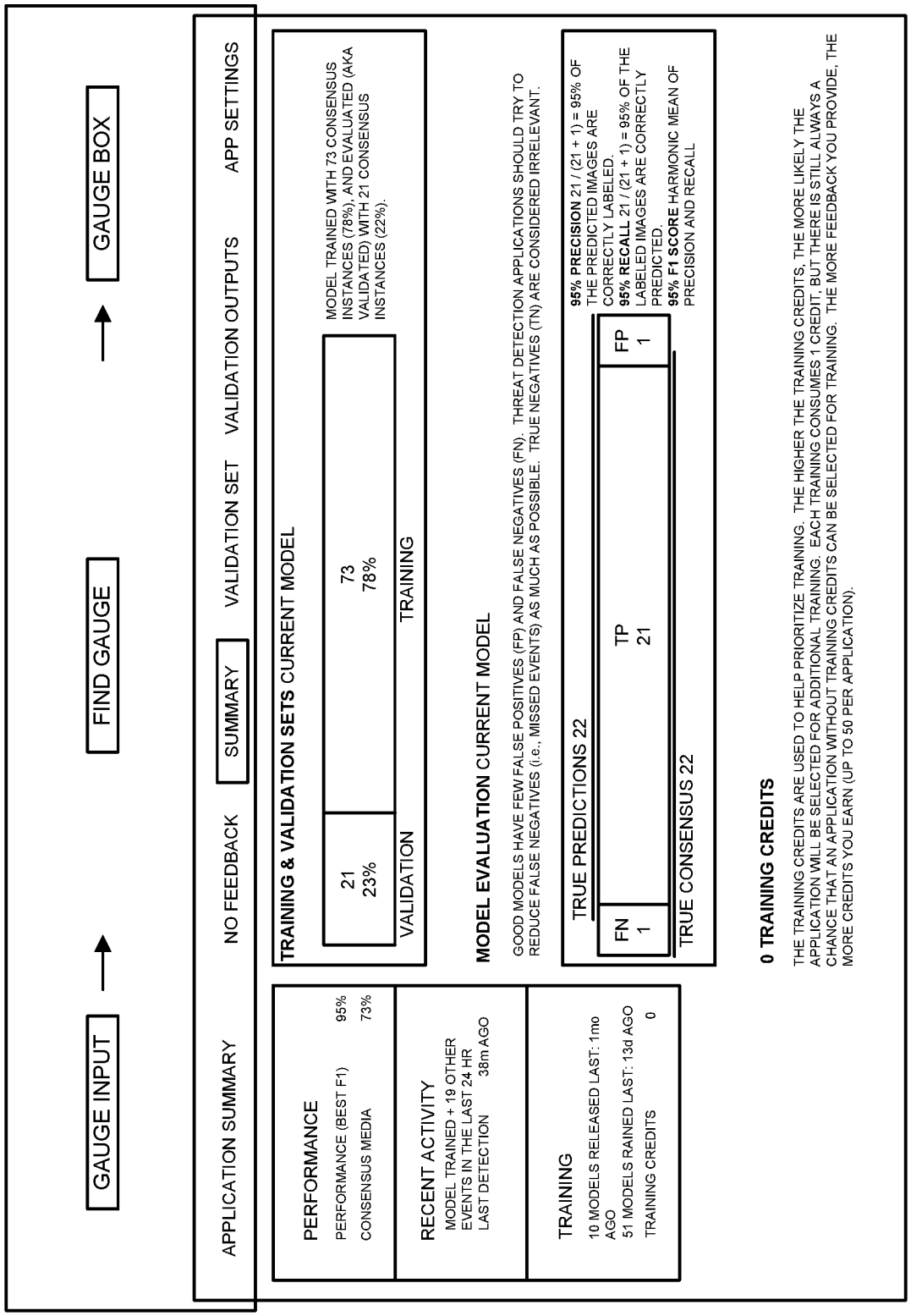
FIG. 11 is a drawing illustrating an example of performance metrics for a data-analysis operation in the data-analysis pipeline of FIG. 9 in accordance with an embodiment of the present disclosure.

In addition to the performance metrics for or associated with the data-analysis operations (which are displayed in data-analysis pipeline 900), in some embodiments the user may select (such as by providing a user-interface command) to view different summary performance metrics for some or all of data-analysis pipeline 900. This is shown in FIG. 10, which presents a drawing illustrating an example of performance metrics (such as one or more graphs of the overall accuracy as a function of time) for a data-analysis operation (e.g., finding the gauge in operation 910 in FIG. 9) in data-analysis pipeline 900 of FIG. 9, such as a screenshot of information displayed on a display. Alternatively or additionally, FIG. 11 presents a drawing illustrating an example of performance metrics (such as a true positive rate and a false positive rate) for a data-analysis operation (e.g., finding the gauge in operation 910 in FIG. 9) in data-analysis pipeline 900 of FIG. 9, such as a screenshot of information displayed on a display.

Figure 12:
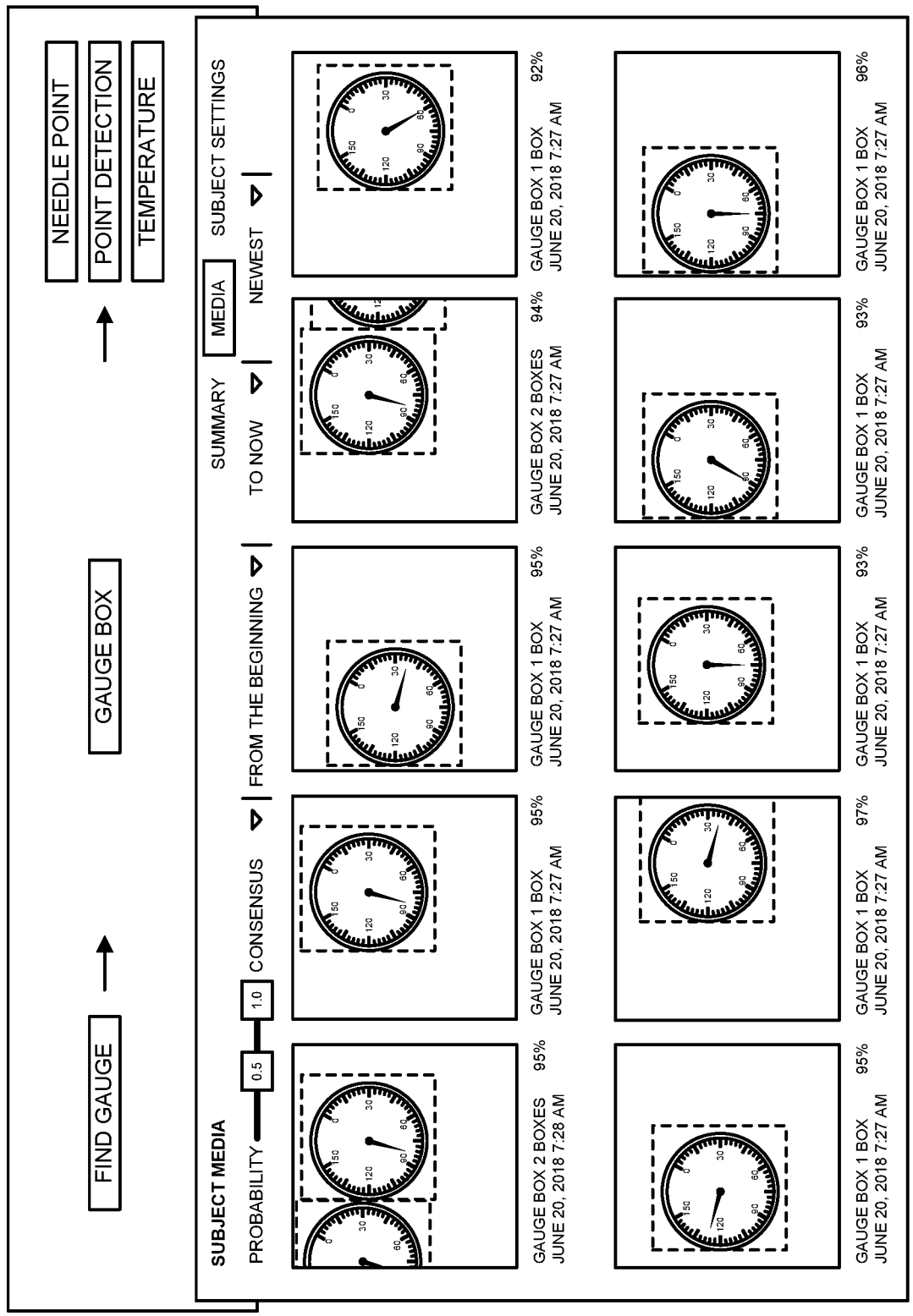
FIG. 12 is a drawing illustrating an example of a group of images or videos and associated performance information for a data-analysis operation in the data-analysis pipeline of FIG. 9 in accordance with an embodiment of the present disclosure.
Figure 14:
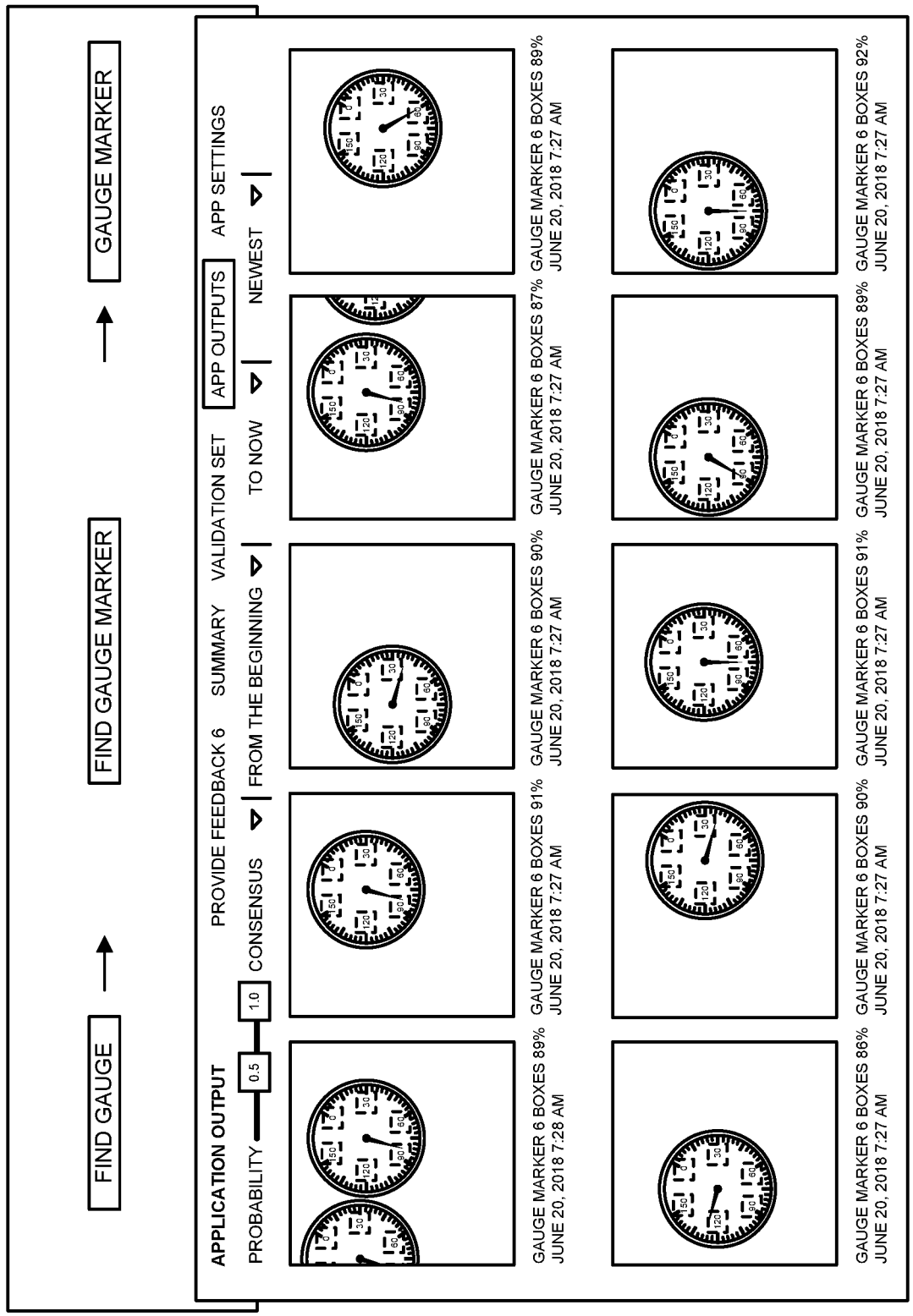
FIG. 14 is a drawing illustrating an example of a group of images or videos and associated performance information for a data-analysis operation in the data-analysis pipeline of FIG. 9 in accordance with an embodiment of the present disclosure.
Figure 15:
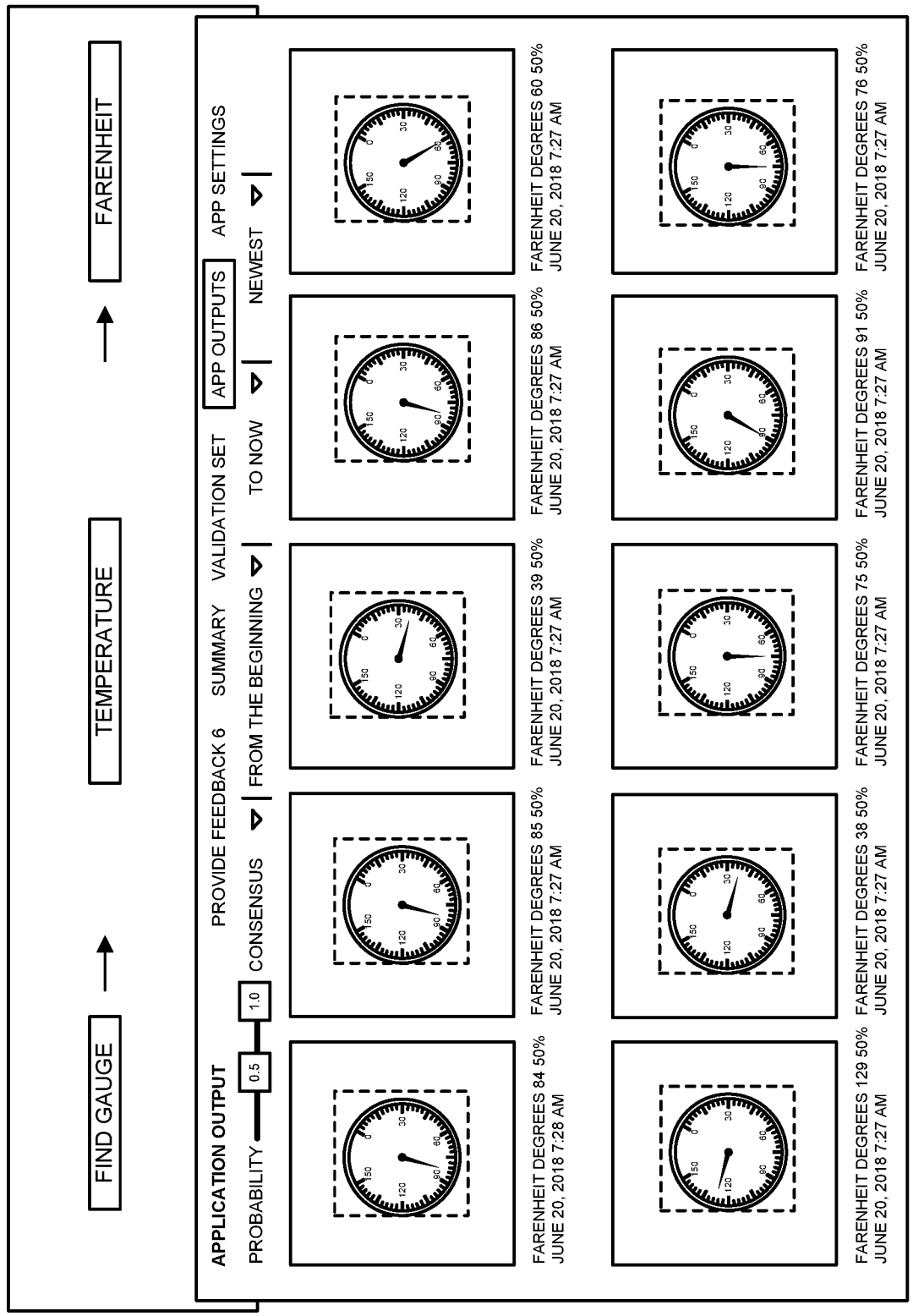
FIG. 15 is a drawing illustrating an example of a group of images or videos and associated performance information for a data-analysis operation in the data-analysis pipeline of FIG. 9 in accordance with an embodiment of the present disclosure.
Figure 16:
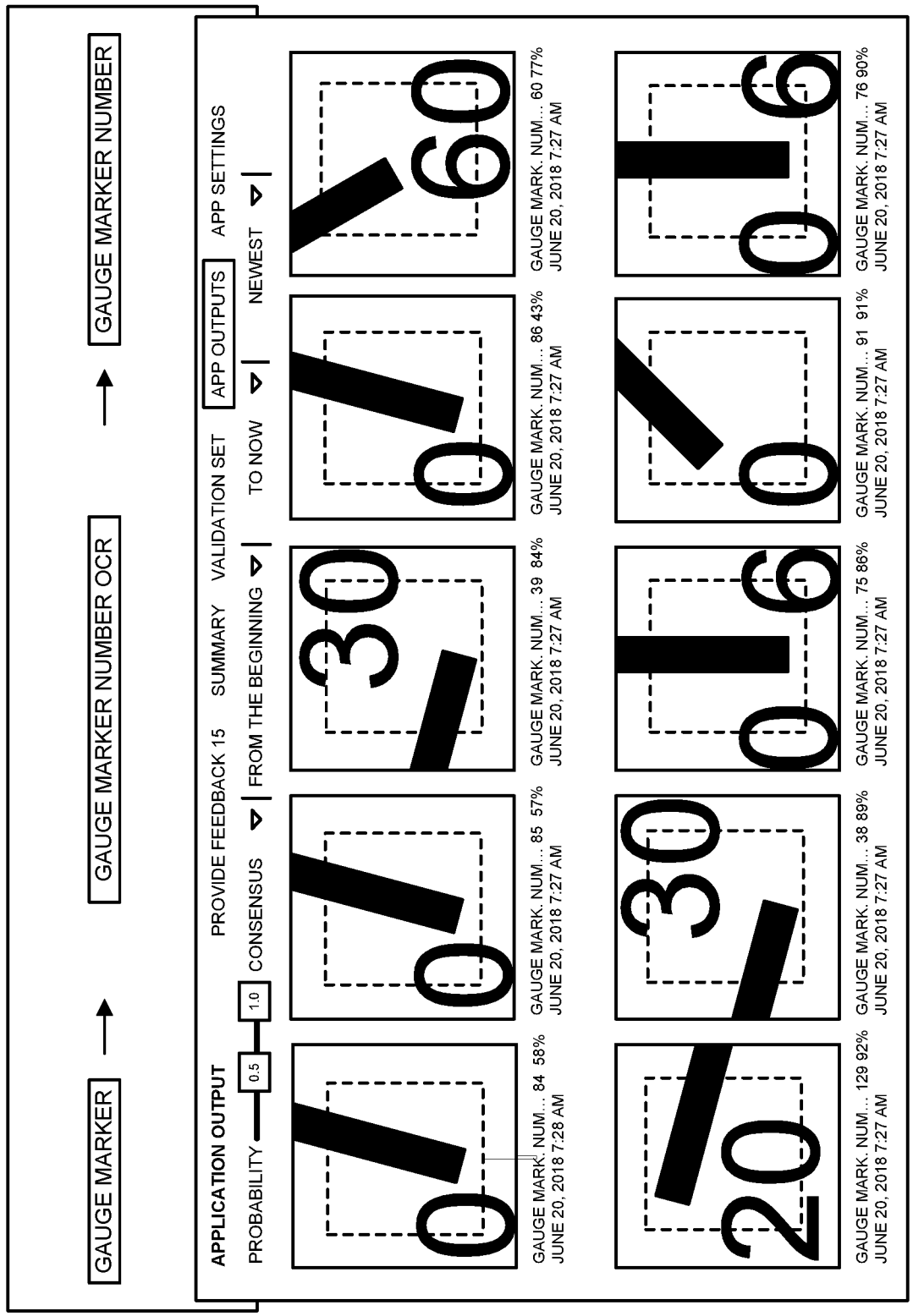
FIG. 16 is a drawing illustrating an example of a group of images or videos and associated performance information for a data-analysis operation in the data-analysis pipeline of FIG. 9 in accordance with an embodiment of the present disclosure.

By providing a user-interface command, the user may select one of the data-analysis operations in data-analysis pipeline 900 of FIG. 9. In response, a group of images or videos and associated performance information for the given data-analysis operation may be presented, where a given image or video corresponds to an instance of the given data-analysis operation. This is shown in FIGS. 12, 14, 15 and 16, which respectively present drawings illustrating examples of a group of images or videos and associated performance information for data-analysis operations in data-analysis pipeline 900 of FIG. 9, such as screenshots of information displayed on a display. Notably, these figures include: finding the gauge in operation 910 in FIG. 9 (as illustrated in FIG. 12); finding the gauge marker in operation 916 in FIG. 9 (as illustrated in FIG. 14); determining the temperature in operation 922 in FIG. 9 (as illustrated in FIG. 15); and determining the gauge marker number in operation 924 in FIG. 9 (as illustrated in FIG. 16).

Figure 13:
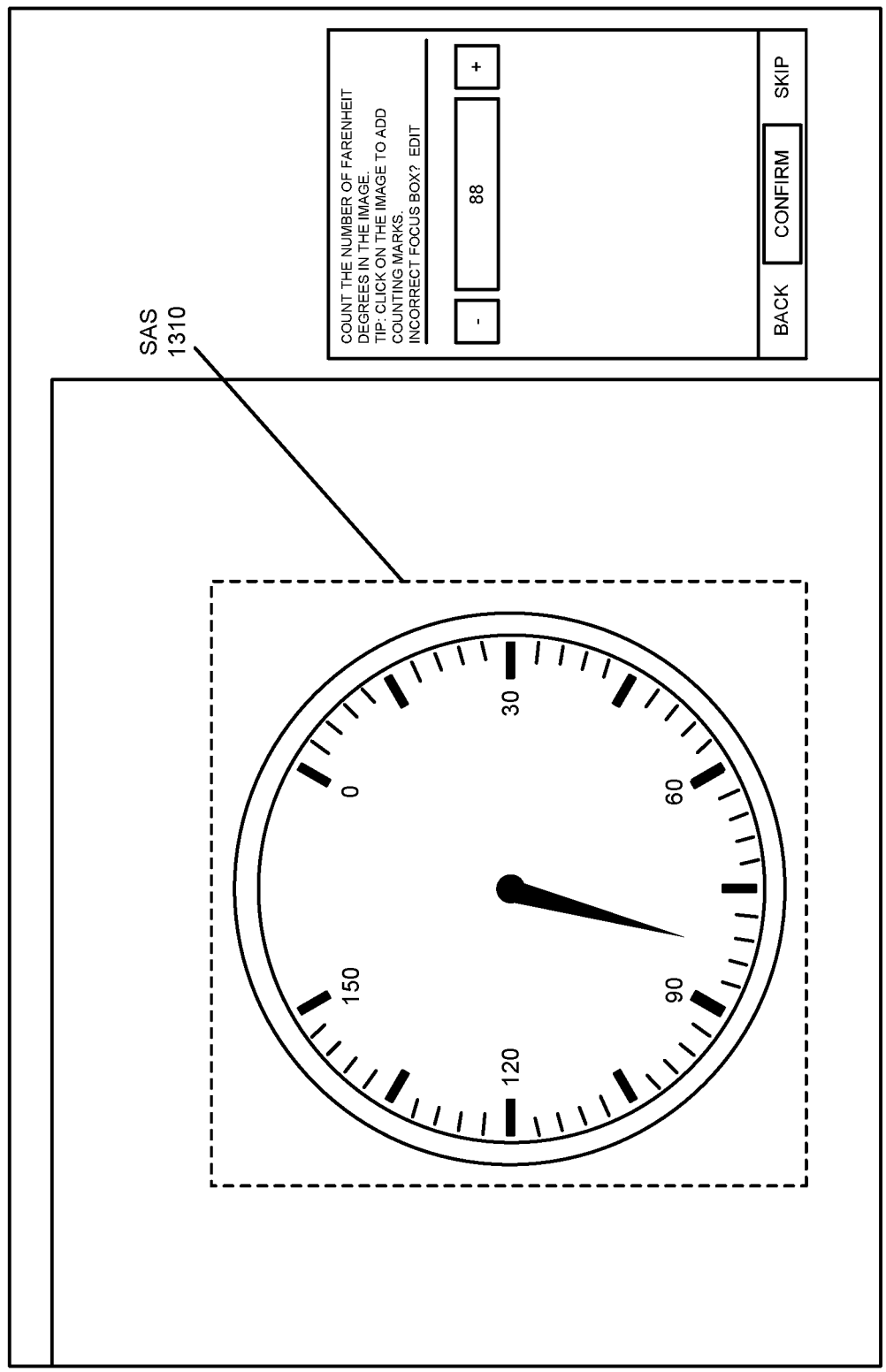
FIG. 13 is a drawing illustrating an example of an image or video and associated performance information for the data-analysis operation of FIG. 12 in accordance with an embodiment of the present disclosure.
Figure 17:
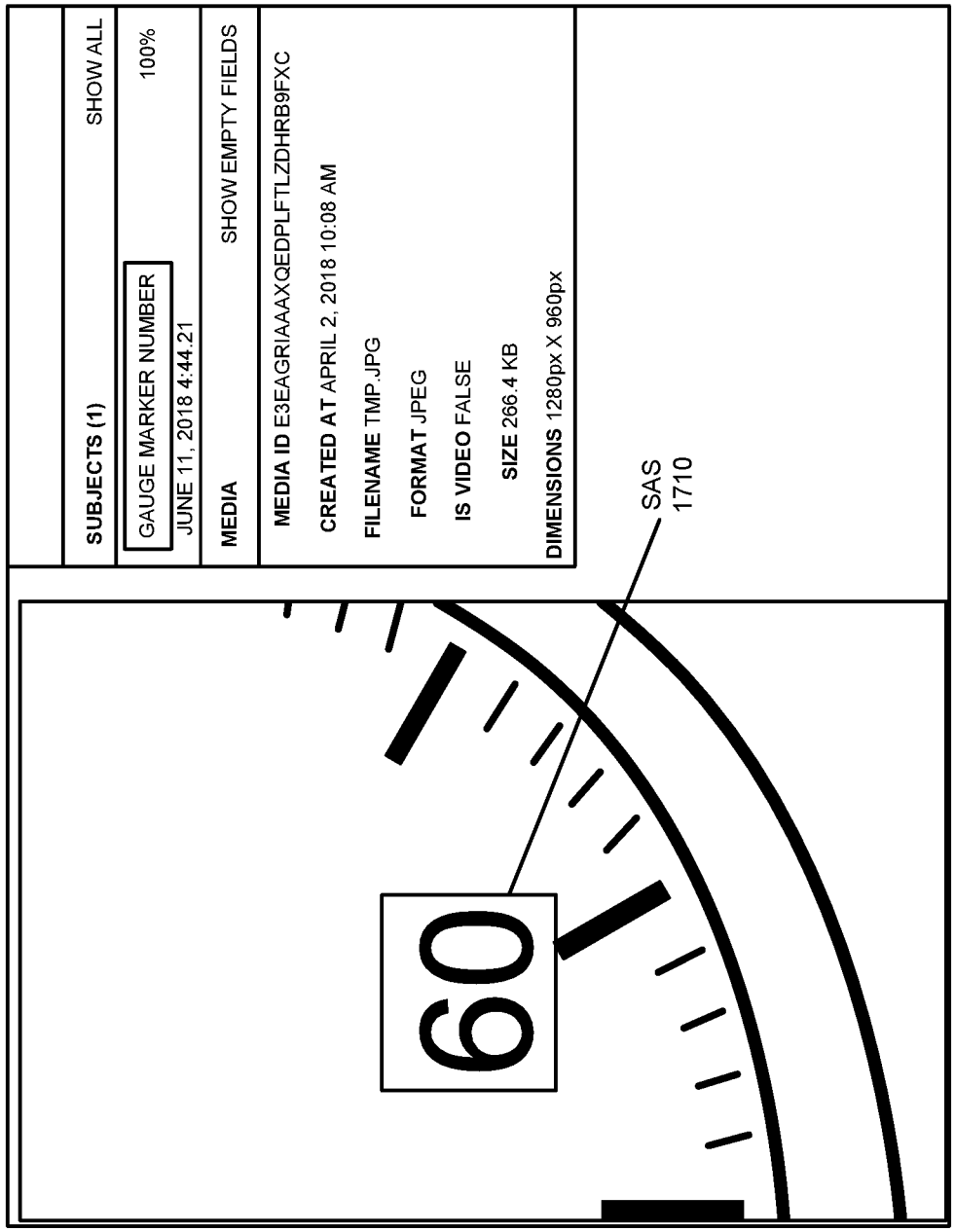
FIG. 17 is a drawing illustrating an example of an image or video and associated performance information for the data-analysis operation of FIG. 16 in accordance with an embodiment of the present disclosure.

Moreover, by providing another user-interface command, the user may select a given image or video in a group of images or videos for the given data-analysis operation. In response, the given image or video and associated performance information for the given data-analysis operation may be presented. This is shown in FIGS. 13 and 17, which respectively present drawings illustrating examples of specific images or videos and associated performance information for different data-analysis operations in FIGS. 12 and 16, such as screenshots of information displayed on a display. Note that FIGS. 13 and 17 illustrate search-area signatures (SASs) or boxes 1310 and 1710, respectively, which may be used during these data-analysis operations to bound or limit the search area when finding the gauge in operation 910 in FIG. 9 or determining the gauge marker number. In FIG. 13, a user is prompted to provide user feedback about the number of Fahrenheit degrees on the gauge and the search-area signature 1310

Depending on the performance metrics associated with a given data-analysis operation or a given image of video for the given data-analysis operation, a user may provide user feedback, such as by providing the user feedback using a user interface. For example, the given data-analysis operation or the given image or video may be an outlier, such as when a performance metric is below a threshold value or is significantly different from a mean or average performance of the data-analysis pipeline, the majority of data-analysis operations, and/or the majority of the images or videos for the given data-analysis operation. In some embodiments, the threshold value is an accuracy that is less than, e.g., 10, 30, 50, 70, 80 or 90%. Alternatively or additionally, significantly different may be, e.g., a performance metric that is more than 2, 3, 4, 5, or 6 time the standard deviation from the mean or the average value.

Note that the user feedback may label or classify the given data-analysis operation or the given image or video. For example, the label may identify a type of object in the given image or video or a quantitative value in the given image or video, either or both of which may facilitate training of the one or more machine-learning models. Alternatively, the label may indicate that the given image or video is an instance of poor performance or is an instance where a different data-analytics operation should be used. In some embodiments, the user feedback may define or specify a target signature (such as a pattern, a shape, spectral content, etc.) that can be used by the given data-analysis operation to identify the object and/or may define or specify a search-area signature (such as a search area or shape, e.g., a rectangle or a square region) that may be used by the given data-analysis operation to identify an object or to perform a quantitative measurement (such as a gauge or meter reading).

Referring back to FIG. 9, based at least in part on the user feedback data-analysis pipeline 900 may be modified. For example, the given data-analysis operation may be changed. Notably, the given data-analysis operation may use one or more revised machine-learning models, which were retrained using the labeled data provided by the user. Alternatively or additionally, one or more parameters that are used by the given data-analysis operation may updated, such as a target signature and/or a search-area signature.

In some embodiments, the user feedback may indicate that a different or a new data-analysis operation is needed to analyze at least some of the images or videos currently being analyzed using the given data-analysis operation. In response to such user feedback, data-analysis pipeline 900 may be modified to add another data-analysis operation. For example, a new path in data-analysis pipeline 900 may be defined, such as a parallel path to an additional data-analysis operation. Consequently, adding of the other data-analysis operation may involve at least bifurcating the given data-analysis operation. In these embodiments, instead of finding the gauge in operation 910, there may be two different finding the gauge in operations 908 and 910, which have different search-area signatures (instead of just using search-area signature 1310 for all images or videos).

In this way, the user may be able to visually assess the performance or operation of data-analysis pipeline 900, including any potential outliers, and may be able to appropriately modify data-analysis pipeline 900 by provide the user feedback. Thus, this analysis technique may allow the user to assess the visual performance feedback by dynamically interact with the interactive visual representation of data-analysis pipeline 900 and to intuitively update or modify data-analysis pipeline 900, e.g., in real time or near real time, by selectively providing user feedback, as needed.

We now describe embodiments of an electronic device. FIG. 18 presents a block diagram illustrating an example of an electronic device 1800, such as one of electronic devices 110, optional base station 114, optional access point 118 and/or computer system 120 in FIG. 1. This electronic device includes processing subsystem 1810, memory subsystem 1812, and networking subsystem 1814. Processing subsystem 1810 includes one or more devices configured to perform computational operations. For example, processing subsystem 1810 can include one or more microprocessors, one or more GPUs, one or more application-specific integrated circuits (ASICs), one or more microcontrollers, one or more programmable-logic devices, and/or one or more digital signal processors (DSPs).

Memory subsystem 1812 includes one or more devices for storing data and/or instructions for processing subsystem 1810 and networking subsystem 1814. For example, memory subsystem 1812 can include dynamic random access memory (DRAM), static random access memory (SRAM), and/or other types of memory. In some embodiments, instructions for processing subsystem 1810 in memory subsystem 1812 include: one or more program modules or sets of instructions (such as program module 1822 or operating system 1824), which may be executed by processing subsystem 1810. Note that the one or more computer programs may constitute a computer-program mechanism. Moreover, instructions in the various modules in memory subsystem 1812 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1810.

In addition, memory subsystem 1812 can include mechanisms for controlling access to the memory. In some embodiments, memory subsystem 1812 includes a memory hierarchy that comprises one or more caches coupled to a memory in electronic device 1800. In some of these embodiments, one or more of the caches is located in processing subsystem 1810.

In some embodiments, memory subsystem 1812 is coupled to one or more high-capacity mass-storage devices (not shown). For example, memory subsystem 1812 can be coupled to a magnetic or optical drive, a solid-state drive, or another type of mass-storage device. In these embodiments, memory subsystem 1812 can be used by electronic device 1800 as fast-access storage for often-used data, while the mass-storage device is used to store less frequently used data.

Figure 19:
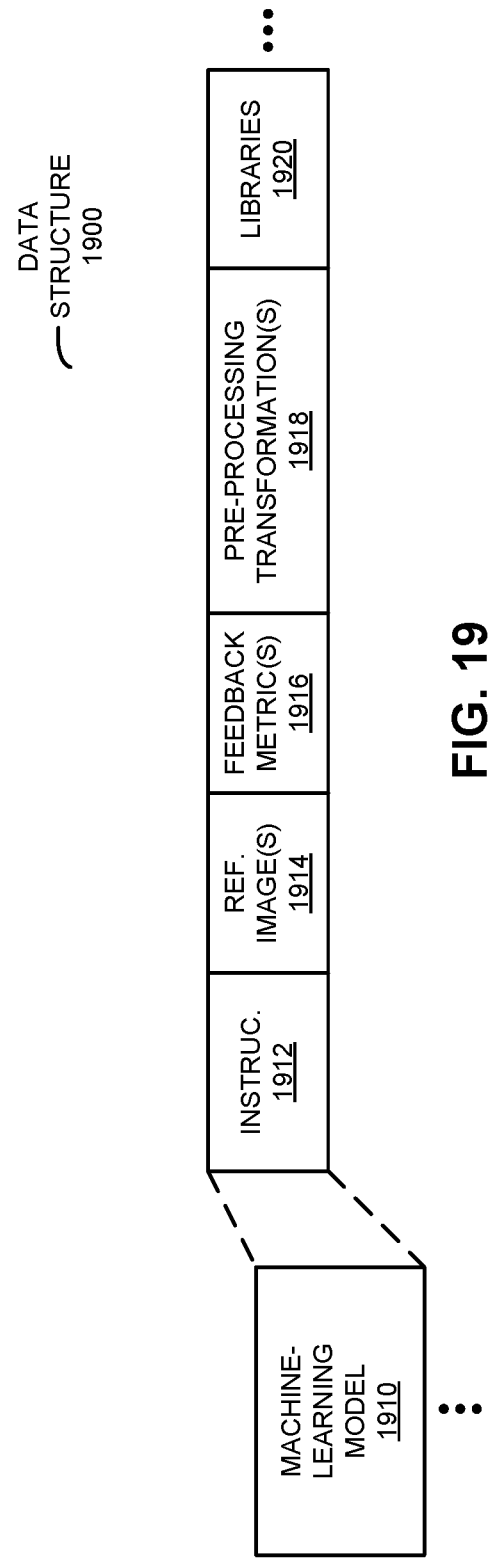
FIG. 19 is a drawing illustrating an example of a data structure that is used by the electronic device in FIG. 13 in accordance with an embodiment of the present disclosure.

Memory subsystem 1812 may store information associated with one or more machine-learning models. This is shown in FIG. 19, which presents an example of a data structure 1900. Notably, data structure 1900 may include: instructions 1912 for a machine-learning model 1910 (such as a neural network), a set of reference images (or inputs) 1914, one or more feedback metrics 1916 for the set of reference images 1914, optionally one or more pre-processing transformations 1918 to apply to set of reference images 1914, and/or optionally one or more libraries 1920. Note that instructions 1912 may include an architecture of machine-learning model 1910 (which is sometimes referred to as a 'network architecture') and/or weights associated with machine-learning model 1910.

Referring back to FIG. 18, networking subsystem 1814 includes one or more devices configured to couple to and communicate on a wired and/or wireless network (i.e., to perform network operations), including: control logic 1816, an interface circuit 1818, one or more antennas 1820 and/or input/output (I/O) port 1830. (While FIG. 18 includes one or more antennas 1820, in some embodiments electronic device 1800 includes one or more nodes 1808, e.g., a pad, which can be coupled to one or more antennas 1820. Thus, electronic device 1800 may or may not include one or more antennas 1820.) For example, networking subsystem 1814 can include a Bluetooth networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 1814 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 1800 may use the mechanisms in networking subsystem 1814 for performing simple wireless communication between the electronic devices, e.g., transmitting advertising or beacon frames and/or scanning for advertising frames transmitted by other electronic devices as described previously.

Within electronic device 1800, processing subsystem 1810, memory subsystem 1812, and networking subsystem 1814 are coupled together using bus 1828. Bus 1828 may include an electrical, optical, and/or electro-optical connection that the subsystems can use to communicate commands and data among one another. Although only one bus 1828 is shown for clarity, different embodiments can include a different number or configuration of electrical, optical, and/or electro-optical connections among the subsystems.

In some embodiments, electronic device 1800 includes a display subsystem 1826 for displaying information on a display, which may include a display driver and the display, such as a liquid-crystal display, a multi-touch touchscreen, etc. Moreover, electronic device 1800 may optionally include an imaging subsystem 1832 with one or more imaging sensors for acquiring or capturing one or more images. (More generally, electronic device 1800 may include a monitoring subsystem with one or more sensors for monitoring or measuring in an environment or of an individual.) Alternatively, electronic device 1800 may receive the one or more images from another electronic device using networking subsystem 1814.

Electronic device 1800 can be (or can be included in) any electronic device with at least one network interface. For example, electronic device 1800 can be (or can be included in): a desktop computer, a laptop computer, a subnotebook/netbook, a server, a tablet computer, a smartphone, a cellular telephone, a smartwatch, a consumer-electronic device, a portable computing device, an access point, a router, a switch, communication equipment, test equipment, a security camera, an aviation drone, a nanny camera, a wearable appliance, and/or another electronic device.

Although specific components are used to describe electronic device 1800, in alternative embodiments, different components and/or subsystems may be present in electronic device 1800. For example, electronic device 1800 may include one or more additional processing subsystems, memory subsystems, networking subsystems, display subsystems and/or audio subsystems. Additionally, one or more of the subsystems may not be present in electronic device 1800. Moreover, in some embodiments, electronic device 1800 may include one or more additional subsystems that are not shown in FIG. 18. Also, although separate subsystems are shown in FIG. 18, in some embodiments, some or all of a given subsystem or component can be integrated into one or more of the other subsystems or component(s) in electronic device 1800. For example, in some embodiments program module 1822 is included in operating system 1824.

Moreover, the circuits and components in electronic device 1800 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 1814, such as a radio. Moreover, the integrated circuit may include hardware and/or software mechanisms that are used for transmitting wireless signals from electronic device 1800 and receiving signals at electronic device 1800 from other electronic devices. Aside from the mechanisms herein described, radios are generally known in the art and hence are not described in detail. In general, networking subsystem 1814 and/or the integrated circuit can include any number of radios. Note that the radios in multiple-radio embodiments function in a similar way to the described single-radio embodiments.

In some embodiments, networking subsystem 1814 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, receiving the input data, etc.)

While communication protocols compatible with Ethernet and Wi-Fi were used as illustrative examples, the described embodiments of the measurement technique and/or the analysis technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the measurement technique and/or the analysis technique may be implemented using program module 1822, operating system 1824 (such as a driver for interface circuit 1818) and/or in firmware in interface circuit 1818. Alternatively or additionally, at least some of the operations in the measurement technique and/or the analysis technique may be implemented in a physical layer, such as hardware in interface circuit 1818.

In the preceding description, we refer to 'some embodiments.' Note that 'some embodiments' describes a subset of all of the possible embodiments, but does not always specify the same subset of embodiments.

Moreover, note that the numerical values provided are intended as illustrations of the communication technique. In other embodiments, the numerical values can be modified or changed.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer system, comprising:
an interface circuit configured to communicate, via a network, with one or more electronic devices;
memory configured to store program instructions for an analysis module configured to perform a set of data-analysis operations in a data-analysis pipeline, wherein the data-analysis operations comprise one or more machine-learning models, and a display module configured to present visual performance feedback with an interactive visual representation of the data-analysis pipeline, wherein the visual representation comprises separate and coupled data-analysis operation in the set of data-analysis operations; and
a processor, coupled to the interface circuit and the memory, configured to execute the program instructions to perform operations comprising:
receiving a user-interface command that specifies a given data-analysis operation;
in response to the user-interface command, presenting a group of images or videos and associated performance information for the given data-analysis operation, wherein a given image or video corresponds to an instance of the given data-analysis operation,
wherein the set of data-analysis operations comprise: identifying a type of object in a first subset of the group of images or videos; and determining numerical values or measurements associated with the type of object in a second subset of the group of images or videos, and
wherein the presented group of images or videos comprises: a first graphical indication associated with the identified type of object in the first subset of the group of images or videos, and a second graphical indication associated with the determined numerical values or measurements in the second subset of the group of images or videos;
receiving user feedback about at least one of the images or videos in the group of images or videos; and
performing a remedial action based at least in part on the user feedback.

2. The computer system of claim 1, wherein the remedial action comprises modifying the data-analysis pipeline based at least in part on the user feedback.

3. The computer system of claim 2, wherein the modification comprises one of: changing the given data-analysis operation, or adding another data-analysis operation to the data-analysis pipeline.

4. The computer system of claim 3, wherein the changing of the given data-analysis operation involves specifying a target signature or a search-area signature.

5. The computer system of claim 3, wherein the adding of the other data-analysis operation involves at least bifurcating the given data-analysis operation.

6. The computer system of claim 1, wherein the operations comprise:
receiving a second user-interface command that specifies the given image or video; and
presenting the given image or video and associated performance information for the given data-analysis operation.

7. The computer system of claim 1, wherein the group of images or videos comprises outliers having different performance information than a majority of instances of the given data-analysis operation.

8. The computer system of claim 1, wherein the data-analysis operations in the set of data-analysis operations are coupled in series, in parallel or both in the visual representation.

9. The computer system of claim 1, wherein the visual representation corresponds to a workflow in the data-analysis pipeline.

10. The computer system of claim 1, wherein the user feedback comprises one of: a target signature, a search-area signature, or a classification or label.

11. The computer system of claim 1, wherein the one or more machine-learning models comprise a neural network.

12. A method for dynamically modifying a data-analysis pipeline, comprising:
by a computer system:
executing an analysis module that performs a set of data-analysis operations in the data-analysis pipeline, wherein the data-analysis operations comprise one or more machine-learning models, and a display module that presents visual performance feedback with an interactive visual representation of the data-analysis pipeline, wherein the visual representation comprises separate and coupled data-analysis operation in the set of data-analysis operations;
receiving a user-interface command that specifies a given data-analysis operation;
in response to the user-interface command, presenting a group of images or videos and associated performance information for the given data-analysis operation, wherein a given image or video corresponds to an instance of the given data-analysis operation,
wherein the set of data-analysis operations comprise: identifying a type of object in a first subset of the group of images or videos; and determining numerical values or measurements associated with the type of object in a second subset of the group of images or videos, and
wherein the presented group of images or videos comprises: a first graphical indication associated with the identified type of object in the first subset of the group of images or videos, and a second graphical indication associated with the determined numerical values or measurements in the second subset of the group of images or videos;
receiving user feedback about at least one of the images or videos in the group of images or videos; and
performing a remedial action based at least in part on the user feedback.

13. The method of claim 12, wherein the remedial action comprises modifying the data-analysis pipeline based at least in part on the user feedback.

14. The method of claim 13, wherein the modifying involves one of: changing the given data-analysis operation, or adding another data-analysis operation to the data-analysis pipeline.

15. The method of claim 14, wherein the adding of the other data-analysis operation involves at least bifurcating the given data-analysis operation.

16. The method of claim 12, wherein the data-analysis operations in the set of data-analysis operations are coupled in series, in parallel or both in the visual representation.

17. A non-transitory computer-readable storage medium for use in conjunction with a computer system, the computer-readable storage medium configured to store software, including an analysis module and a display module, that, when executed by the computer system, causes the computer system to:
executing the analysis module that performs a set of data-analysis operations in a data-analysis pipeline, wherein the data-analysis operations comprise one or more machine-learning models, and the display module that presents visual performance feedback with an interactive visual representation of the data-analysis pipeline, wherein the visual representation comprises separate and coupled data-analysis operation in the set of data-analysis operations;
receiving a user-interface command that specifies a given data-analysis operation;
in response to the user-interface command, presenting a group of images or videos and associated performance information for the given data-analysis operation, wherein a given image or video corresponds to an instance of the given data-analysis operation,
wherein the set of data-analysis operations comprise: identifying a type of object in a first subset of the group of images or videos; and determining numerical values or measurements associated with the type of object in a second subset of the group of images or videos, and
wherein the presented group of images or videos comprises: a first graphical indication associated with the identified type of object in the first subset of the group of images or videos, and a second graphical indication associated with the determined numerical values or measurements in the second subset of the group of images or videos;
receiving user feedback about at least one of the images or videos in the group of images or videos; and
performing a remedial action based at least in part on the user feedback.

18. The computer-readable storage medium of claim 17, wherein the remedial action comprises modifying the data-analysis pipeline based at least in part on the user feedback.

19. The computer-readable storage medium of claim 18, wherein the modifying involves one of: changing the given data-analysis operation, or adding another data-analysis operation to the data-analysis pipeline.

20. The computer-readable storage medium of claim 19, wherein the adding of the other data-analysis operation involves at least bifurcating the given data-analysis operation.

* * * * *